United States Patent
Jimenez et al.

(10) Patent No.: US 11,034,625 B2
(45) Date of Patent: Jun. 15, 2021

(54) CONDITIONED CURING SYSTEMS AND PROCESSES THEREOF

(71) Applicant: Solidia Technologies, Inc., Piscataway, NJ (US)

(72) Inventors: Andrea Cecilia Montoya Jimenez, Piscataway, NJ (US); Vahit Atakan, Princeton, NJ (US); Andres Martiny, Boonton, NJ (US); George Matthew Perry, Metuchen, NJ (US); Kenneth Michael Smith, Somerville, NJ (US); Devin Patten, Red Bank, NJ (US); Daniel Castoro, Lincroft, NJ (US); Shalendra Narine, Westfield, NJ (US); Anuj Seth, East Brunswick, NJ (US); Sean Camron Quinn, Branchburg, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 389 days.

(21) Appl. No.: 15/609,908

(22) Filed: May 31, 2017

(65) Prior Publication Data

US 2017/0341989 A1    Nov. 30, 2017

Related U.S. Application Data

(60) Provisional application No. 62/343,633, filed on May 31, 2016.

(51) Int. Cl.
*C04B 40/02* (2006.01)

(52) U.S. Cl.
CPC ........... *C04B 40/0231* (2013.01); *Y02P 40/18* (2015.11)

(58) Field of Classification Search
CPC ...... C04B 40/0231; B32B 13/00; B28B 11/24
See application file for complete search history.

(56) References Cited

U.S. PATENT DOCUMENTS

| | | | | |
|---|---|---|---|---|
| 4,427,610 A | * | 1/1984 | Murray | ............... C04B 40/0231 264/234 |
| 4,436,498 A | | 3/1984 | Murray | |
| 5,709,038 A | * | 1/1998 | Scheufler | .............. F26B 21/003 34/475 |
| 5,935,317 A | * | 8/1999 | Soroushian | ......... C04B 40/0231 106/723 |
| 2014/0314990 A1 | * | 10/2014 | Henn | ...................... C04B 35/22 428/141 |

(Continued)

FOREIGN PATENT DOCUMENTS

| CN | 104493965 A | 4/2015 |
|---|---|---|
| JP | 2009-149456 A | 7/2009 |

(Continued)

*Primary Examiner* — Matthew J Daniels
*Assistant Examiner* — Mohammad M Ameen
(74) *Attorney, Agent, or Firm* — Dentons US LLP

(57) ABSTRACT

The invention provides novel apparatus and processes for gas flow and conditioning to achieve optimal $CO_2$ curing of articles of composite materials (e.g., precast objects made of carbonatable calcium silicate-based cements), with solid interior or having hollow interior ducts, channels and chambers or otherwise being hollowed out, as well as the precast objects so made, which are suitable for a variety of applications in construction, pavements and landscaping, and infrastructure.

26 Claims, 36 Drawing Sheets

(56) References Cited

U.S. PATENT DOCUMENTS

2014/0322083 A1* 10/2014 Kuppler ................ B01J 10/005
                                                    422/109
2014/0361471 A1* 12/2014 Hu ...................... C04B 40/0231
                                                    264/638

FOREIGN PATENT DOCUMENTS

| JP | 5270145 B2 | 8/2013 |
|----|------------|--------|
| RU | 178442 A1 | 12/1992 |
| RU | 2519080 C2 | 6/2014 |
| WO | 2014/160168 A1 | 10/2014 |
| WO | 2015/051243 A2 | 4/2015 |
| WO | 2016/022522 A2 | 2/2016 |

\* cited by examiner

CONDITIONED CURING SYSTEMS AND PROCESSES THEREOF

PRIORITY CLAIMS AND RELATED PATENT APPLICATIONS

This application claims the benefit of priority from U.S. Provisional Application Ser. No. 62/343,633, filed on May 31, 2016, the entire content of which is incorporated herein by reference in its entirety.

FIELD OF THE INVENTION

The invention generally relates to systems and processes for making articles of composite materials. More particularly, the invention relates to novel apparatus and processes for gas flow and conditioning to achieve optimal $CO_2$ curing of articles of composite materials (e.g., precast objects made of carbonatable calcium silicate-based cements), with solid interior or having hollow interior ducts, channels and chambers or otherwise being hollowed out, as well as the precast objects so made, which are suitable for a variety of applications in construction, pavements and landscaping, and infrastructure.

BACKGROUND OF THE INVENTION

Concrete is the most consumed man-made material in the world. Precast concrete products, such as pavers, blocks, hollow core slabs, roof tiles, aerated concrete blocks, etc., are widely used in construction, pavements and landscaping, to infrastructure and transportation.

A typical concrete product is made by mixing water and aggregates such as sand and crushed stone with Portland cement, a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cement and concrete products. Production of carbonatable calcium silicate-based cements and concrete products involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

Most precast objects manufactured today are made from conventional concrete and are not optimal in terms of both economics and environmental impact. Existing production technologies involve large energy consumption and carbon dioxide emission, leading to unfavorable carbon footprints.

Thus, there is an on-going need for novel precast objection systems and processes with improved product quality, energy consumption and desirable carbon footprint.

SUMMARY OF THE INVENTION

The invention provides novel apparatus and processes for gas flow and conditioning to achieve optimal $CO_2$ curing of articles of composite materials, with solid interior or having hollow interior ducts, channels and chambers or otherwise being hollowed out, as well as the objects so made.

In one aspect, the invention generally relates to a process for curing a precast object. The process includes: introducing the precast object into an envelope that is capable of containing a gas (e.g., the envelope is sealed or vented); providing a primary gas circulation loop; providing one or more secondary gas circulation loop; and curing the precast object for a time sufficient to produce a cured precast object. The primary gas circulation loop includes: introducing a gas (e.g., $CO_2$) at a first condition into the envelope, flowing the gas over a surface of the precast object inside the envelope to bring the gas to a second condition, passing the gas at the second condition through a primary gas conditioning system to restore the gas to its first condition, and recirculating the gas into the primary gas circulation loop. The secondary gas circulation loop includes: taking the gas in the envelope at a third condition, passing it through a secondary gas conditioning system to condition it to a fourth condition, and flowing the gas after conditioning to the fourth condition over at least another surface of the precast object.

In some embodiments, the precast object is made of a carbonatable calcium silicate-based cement and the gas comprises carbon dioxide. The gas may be comprised of carbon dioxide, water vapor, air, and possibly other gases. Carbon dioxide may be provided from any convenient source that can supply sufficient gas quantities at high enough purity. In some embodiments, the source of carbon dioxide is gas generated from liquid carbon dioxide. In some embodiments, the source of carbon dioxide is gas provided in the form of gas in a high-pressure cylinder. In some embodiments, the source of carbon dioxide is effluent from a combustion system that is processed to provide a supply of purified carbon dioxide. In some embodiments, the gas comprises industrial grade carbon dioxide. In some embodiments, the gas consists essentially of industrial grade carbon dioxide.

In some embodiments, a plurality of secondary gas circulation loops are present.

In some embodiments, at least one of the secondary gas conditioning system of the secondary gas circulation loop is located within the envelope.

In some embodiments, the secondary gas conditioning system and the primary gas conditioning system are the same system. In some embodiments, the secondary gas conditioning system and the primary gas conditioning system are different systems.

In some embodiments, passing the gas over the surface and another surface of the precast object comprises flowing the gas through a void inside the precast object.

In some embodiments, the secondary gas conditioning system comprises at least a heating unit to raise the temperature of the gas. In some embodiments, the secondary gas conditioning system comprises a plurality of heating units to raise the temperature of the gas.

In some embodiments, the secondary gas circulation loop comprises at least a fan to increase the flow of the gas. In some embodiments, the secondary gas circulation loop comprises a plurality of fans to increase the flow of the gas. In some embodiments, the secondary gas circulation loop has at least some of the fans configured to flow the gas in an opposite direction as compared with the other fans. In some embodiments, the secondary gas circulation loop has at least some of the fans configured to flow the gas at a first speed while the other fans as configured to flow gas at a speed different from the first speed.

In some embodiments, the secondary gas circulation loop comprises a plurality of fans, wherein the adjacent fans blow at two different speeds, with the first blowing at a speed one and the second blowing at a speed two. In some embodiments, the secondary gas circulation loop comprising the adjacent fans blowing at two different speeds are blowing gas in opposite directions. In some embodiments, the secondary gas circulation loop comprising the adjacent fans comprises a heating element in at least one of the fans.

In some embodiments, the secondary gas conditioning system comprises a dehumidification unit to remove moisture from the gas and to reduce the relative humidity. In some embodiments, the dehumidification unit comprises a chiller, a desiccant, a membrane capable of moisture removal, or a combination of two or more thereof.

In some embodiments, the fourth condition of the gas is substantially the same as the first condition of the gas. In some embodiments, the third condition of the gas is substantially the same as the second condition of the gas. In some embodiments, the fourth condition of the gas is substantially different from the first condition of the gas. In some embodiments, the third condition of the gas is substantially different from the second condition of the gas.

In some embodiments, the gas at the fourth condition after passing through the secondary gas conditioning system is flowed over the another surface of the precast object, wherein the another surface of the precast object is adjacent to the point where it was taken from within the envelope for passing through the secondary gas conditioning system.

In some embodiments, the gas at the fourth condition after passing through the secondary gas conditioning system is flowed over the another surface of the precast object, wherein, the another surface of the precast object is at a point away from the point where it was taken from within the envelope for passing through the secondary gas conditioning system.

In some embodiments, the precast object is a plurality of objects selected from the group consisting of pavers, blocks, roof tiles and railroad ties.

In some embodiments, the precast object is a hollow core slab comprising a plurality of channels running along the length of the hollow core slab. In some embodiments, the hollow core slab comprises from about 4 to about 10 channels.

In some embodiments, the gas at the first condition is introduced into the envelope through the channels of the hollow core slab. In some embodiments, the gas at the first condition is introduced into the envelope from the top or sides of the hollow core slab. In some embodiments, the gas at the first condition is introduced into the envelope from the bottom of the slab through the casting bed.

In some embodiments, the first condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In some embodiments, the second condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In some embodiments, the third condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In some embodiments, the fourth condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In another aspect, the invention generally related to a process for curing a precast object. The process includes: introducing the precast object into an envelope that is capable of containing a gas, wherein the envelope is sealed or vented; and providing a primary gas circulation loop; and curing the precast object for a time sufficient to produce a cured precast object. The primary gas circulation loop includes: introducing a gas at a first condition into the envelope, flowing the gas over a surface of the precast object inside the envelope to bring the gas to a second condition, passing the gas at the second condition through a primary gas conditioning system to restore the gas to its first condition, and recirculating the gas into the primary gas circulation loop. The primary gas conditioning system includes: flowing the gas at a first flow rate over a heating unit to increase the temperature of the gas, and flowing the gas through a dehumidification unit at a second flow rate to reduce the relative humidity.

In some embodiments, the precast object is made of a carbonatable calcium silicate-based cement and the gas comprises carbon dioxide. In preferred embodiments, the gas comprises industrial grade carbon dioxide. In preferred embodiments, the gas consists essentially of industrial grade carbon dioxide.

In some embodiments, passing the gas over the surface of the precast object comprises flowing the gas through a void inside the precast object.

In some embodiments, the precast object comprises a plurality of objects selected from the group consisting of pavers, blocks, roof tiles and railroad ties.

In some embodiments, the precast object is a hollow core slab comprising a plurality of channels running along the length of the hollow core slab. In certain embodiments, the voids in the precast object are at least one of the plurality of channels running along the length of the hollow core slab. In certain embodiments, the hollow core slab comprises from about 4 to about 10 channels.

In some embodiments, the flow of gas at a first speed over the heater and the flow of gas through a dehumidification unit at a second speed are in parallel setup.

In some embodiments, the direction of flow of the primary gas circulation loop changes direction during curing of the precast object.

In some embodiments, the first condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In some embodiments, the second condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

In yet another aspect, the invention generally relates to a cured precast object produced by a process disclosed herein.

In some embodiments, the cured precast object is a cured hollow core slab. In certain embodiments, the cured hollow core slab has a continuous length of at least about 50 meters. In certain embodiments, the cured hollow core slab has a continuous length of at least about 75 meters. In certain embodiments, the cured hollow core slab has a continuous length of at least about 100 meters. In certain embodiments, the cured hollow core slab is characterized by a compressive strength greater than about 30 MPa.

In yet another aspect, the invention generally relates to an apparatus for curing a precast object. The apparatus includes: an envelope that is capable of containing a gas, wherein the envelope configured to sealable or ventable; a primary gas circulation loop connected to the envelope, wherein the primary gas circulation loop comprises one or more primary gas conditioning systems capable of conditioning the gas at a second condition to restore the gas to a first condition; one or more secondary gas circulation loops, wherein the secondary gas circulation loop comprises one or more secondary gas conditioning systems to condition the gas at a third condition to a fourth condition.

In some embodiments, at least one of the secondary gas conditioning system of the secondary gas circulation loop is located within the envelope. In certain embodiments, the apparatus includes a plurality of secondary gas circulation loops.

In some embodiments, the secondary gas conditioning system and the primary gas conditioning system are the same system. In certain embodiments, the secondary gas conditioning system and the primary gas conditioning system are different systems.

In some embodiments, the secondary gas conditioning system comprises at least a heating unit. In certain embodiments, the secondary gas conditioning system comprises a plurality of heating units.

In some embodiments, the secondary gas circulation loop comprises at least a fan. In certain embodiments, the secondary gas circulation loop comprises a plurality of fans. In certain embodiments, the secondary gas circulation loop has at least some of the fans configured to flow the gas in an opposite direction as compared with the other fans. In certain embodiments, the secondary gas circulation loop has at least some of the fans configured to flow a gas at a first speed while the other fans as configured to flow a gas at a speed different from the first speed.

In some embodiments, the secondary gas circulation loop comprises a plurality of fans, wherein the adjacent fans blow at two different speeds, with the first blowing at a speed one and the second blowing at a speed two. In some embodiments, the secondary gas circulation loop comprising the adjacent fans blowing at two different speeds are blowing gas in opposite directions. In some embodiments, the secondary gas circulation loop comprising the adjacent fans comprises a heating element in at least one of the fans.

In some embodiments, the secondary gas conditioning system comprises a dehumidification unit. In certain embodiments, the dehumidification unit comprises a chiller, a desiccant, a membrane capable of moisture removal, or a combination of two or more thereof.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 50 shows an embodiment of end plate designed for supporting the gas tight sealed tarp chamber while providing a sealable slot in the bottom section to allow for the reinforcement strands to pass through.

DETAILED DESCRIPTION OF THE INVENTION

Figure 1:
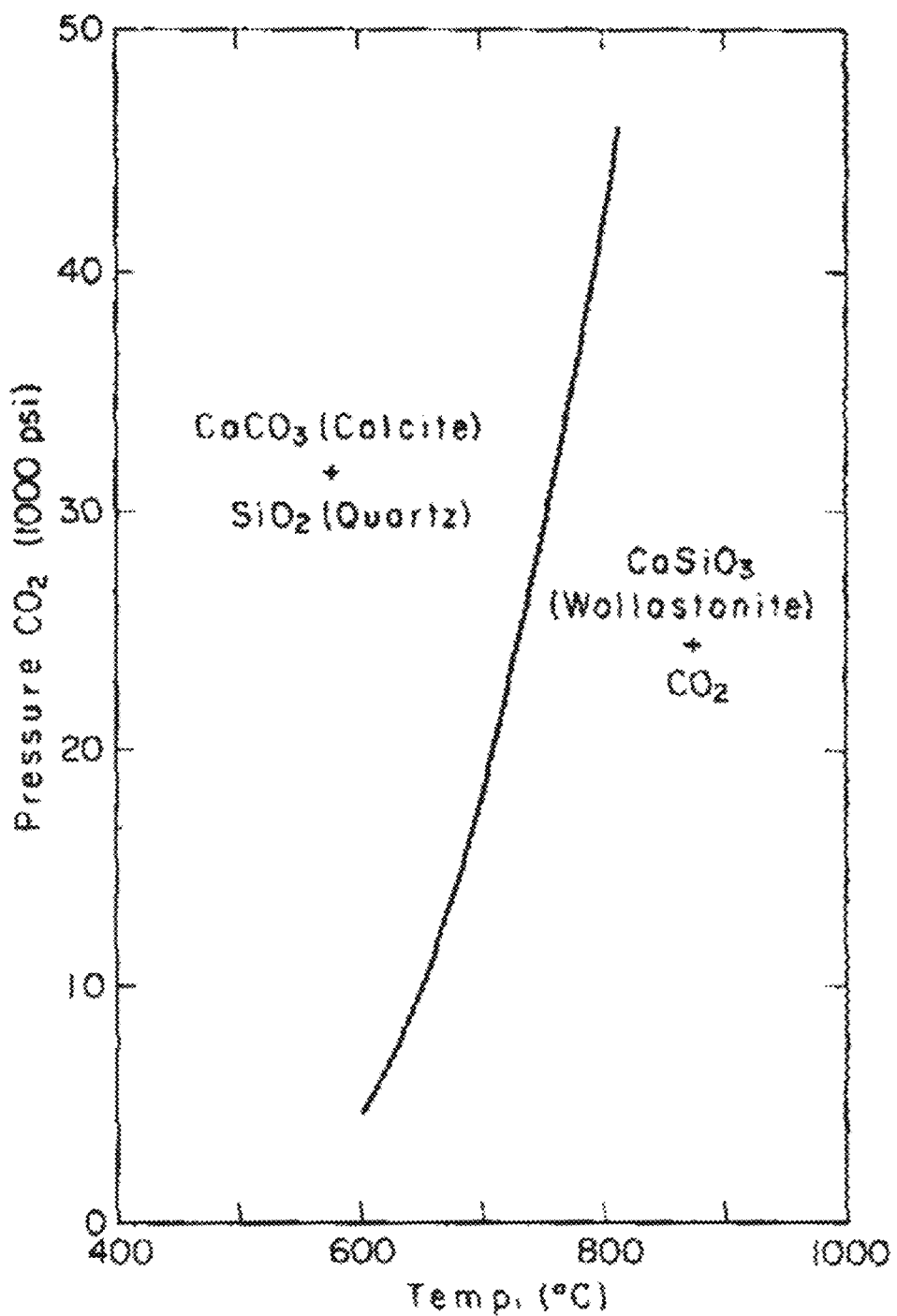
FIG. 1 is a pressure-temperature phase diagram showing the phases present in the reversible reaction $CaCO_3 + SiO_2 \leftrightarrow CaSiO_3$ (calcium silicate) $+ CO_2$.
Figure 2:
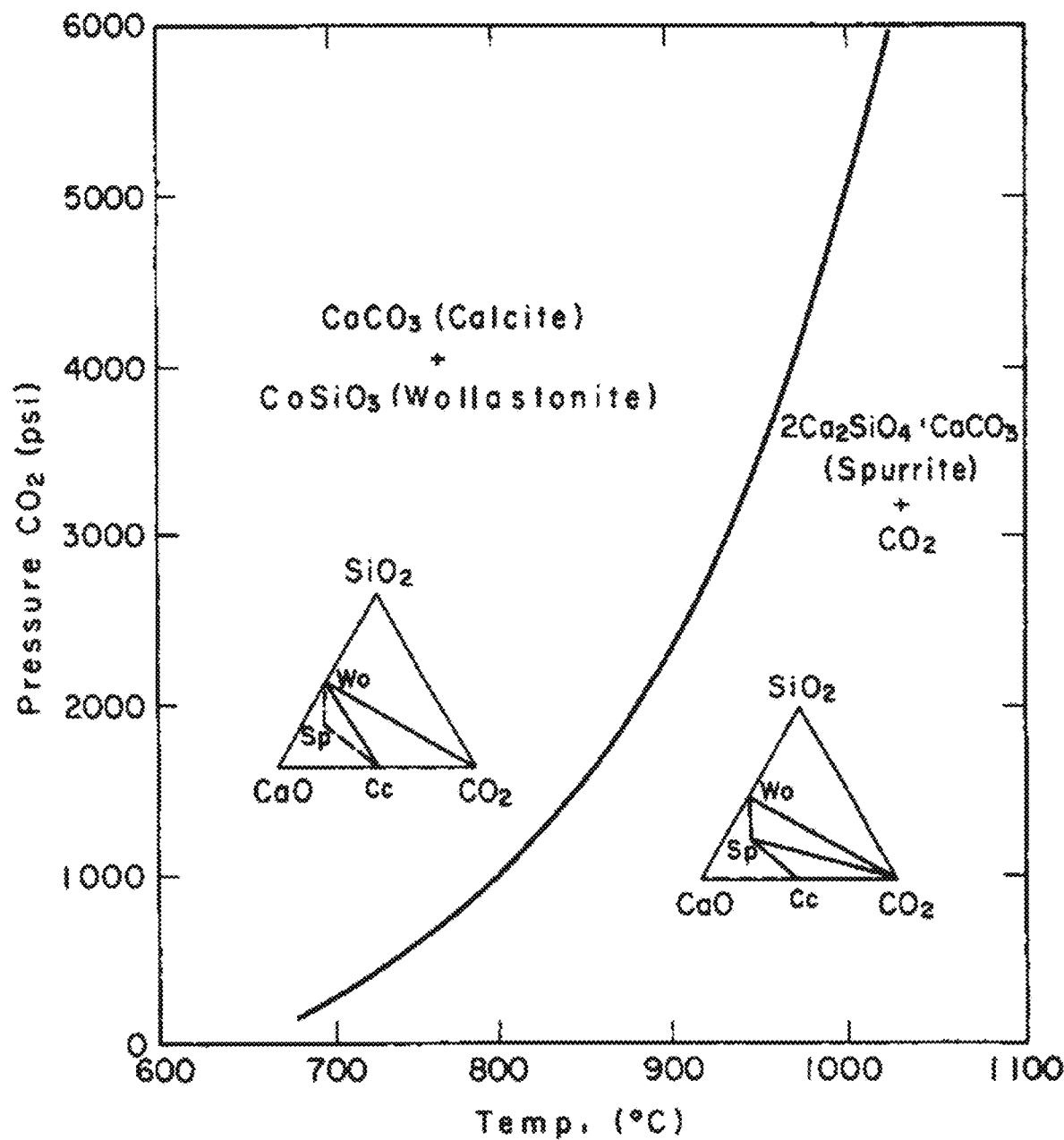
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
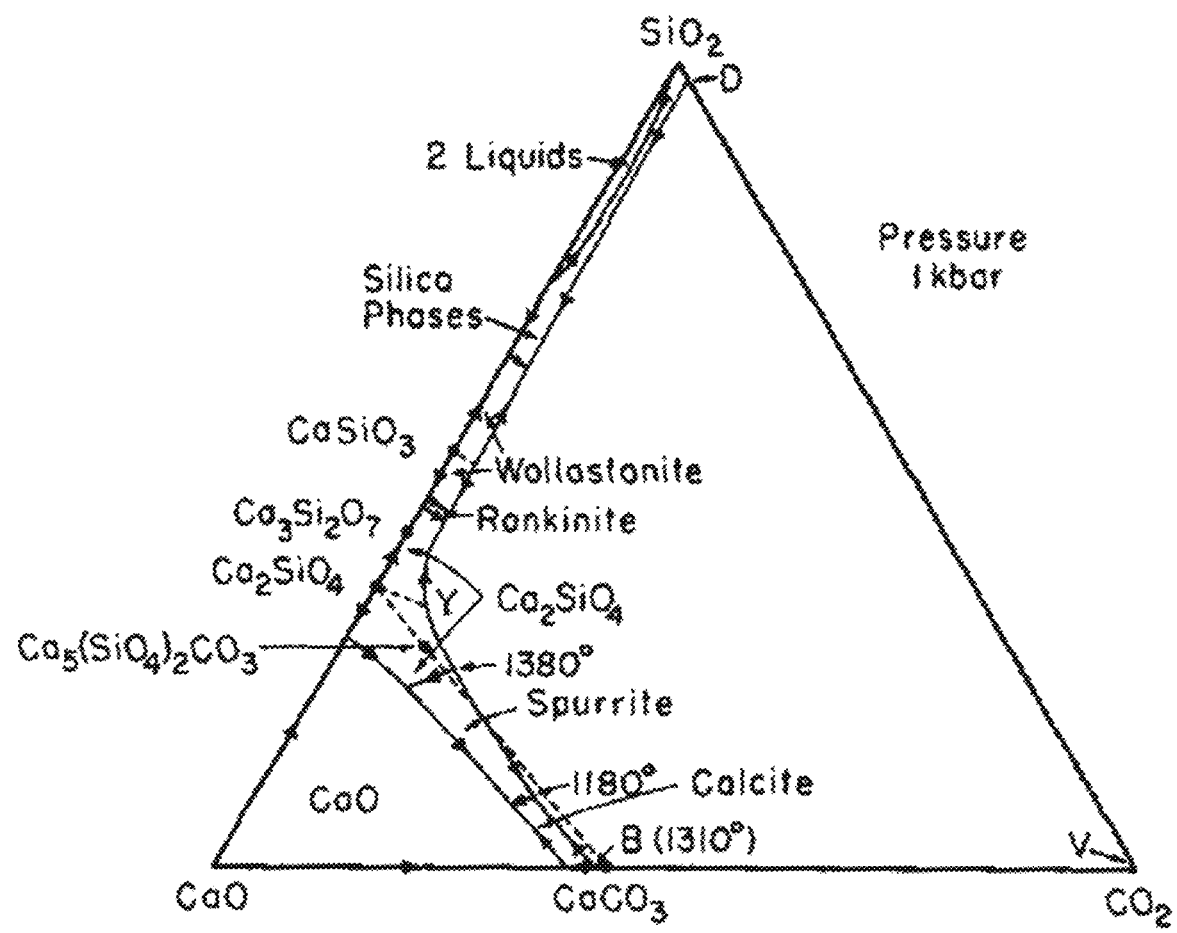
FIG. 3 is a phase diagram of the $CaO—SiO_2—CO_2$ system at a pressure of 1 kilobar.
Figure 4:
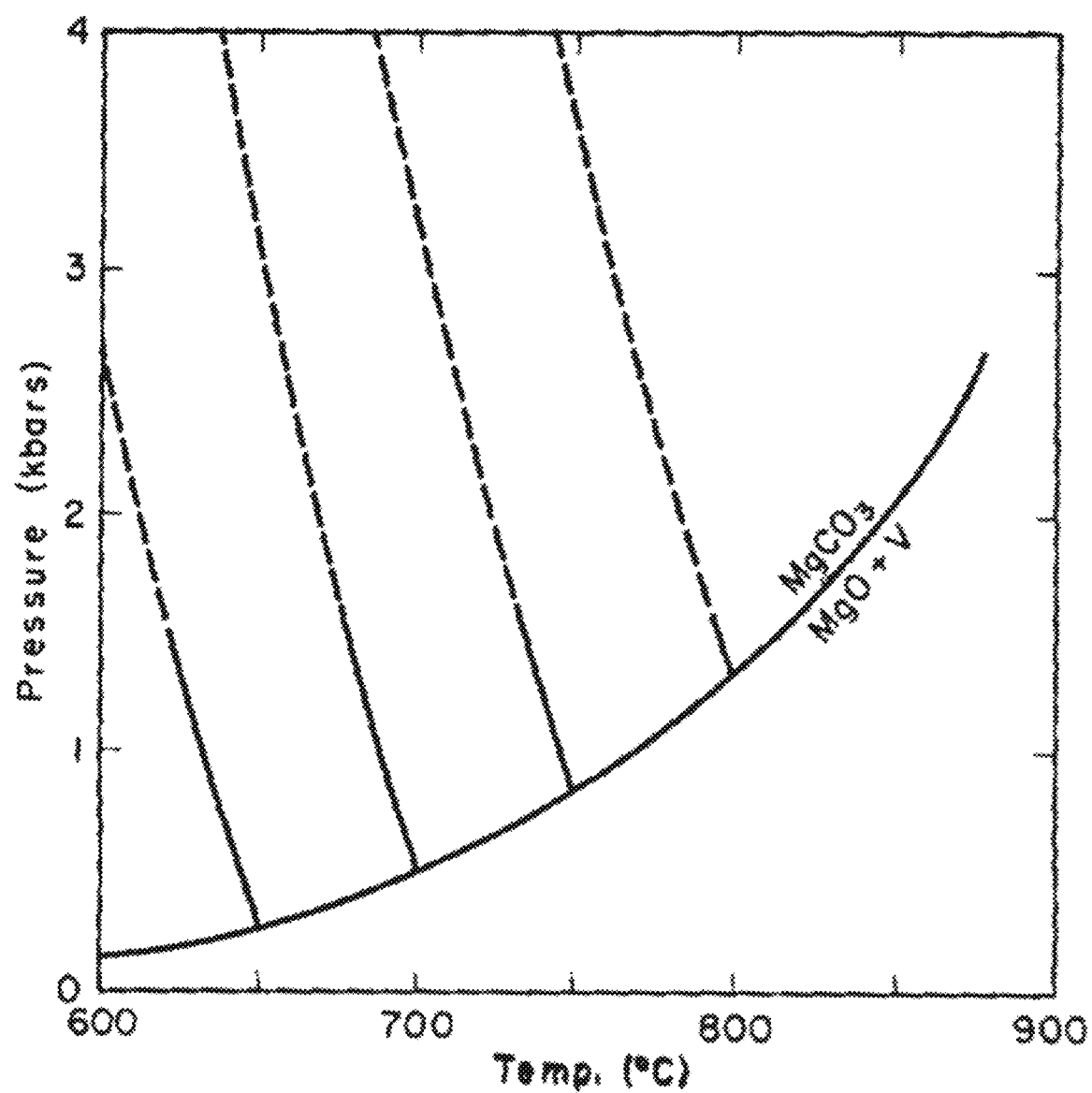
FIG. 4 is a pressure-temperature phase diagram showing the phases present in the reversible reaction $MgO + CO_2 \leftrightarrow MgCO_3$.
Figure 5:
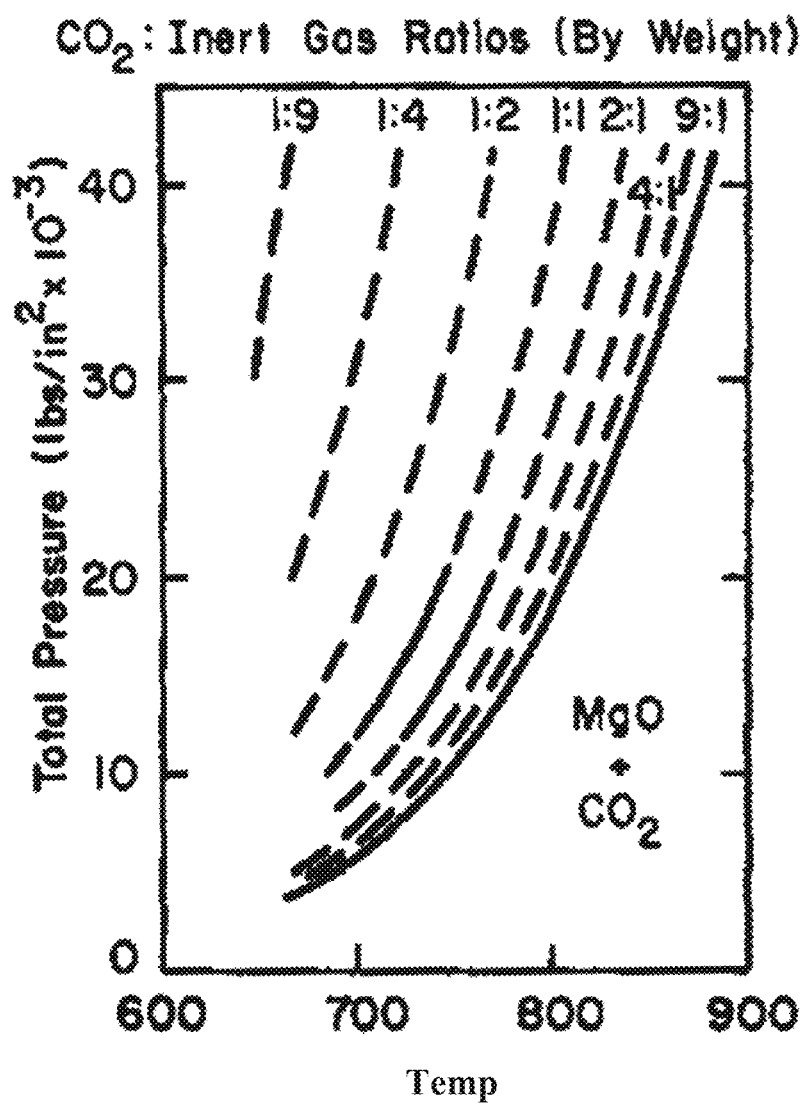
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
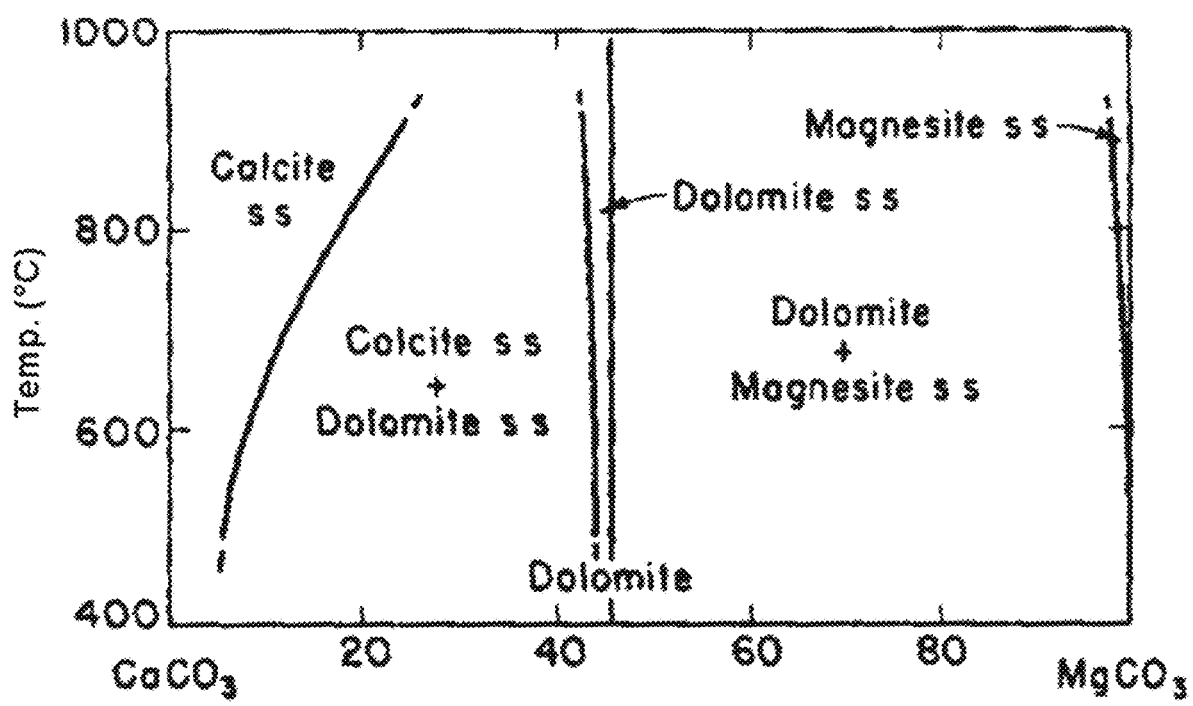
FIG. 6 is a temperature-composition phase diagram that illustrates the stability regions for various phases in the $CaCO_3—MgCO_3$ system.
Figure 7:
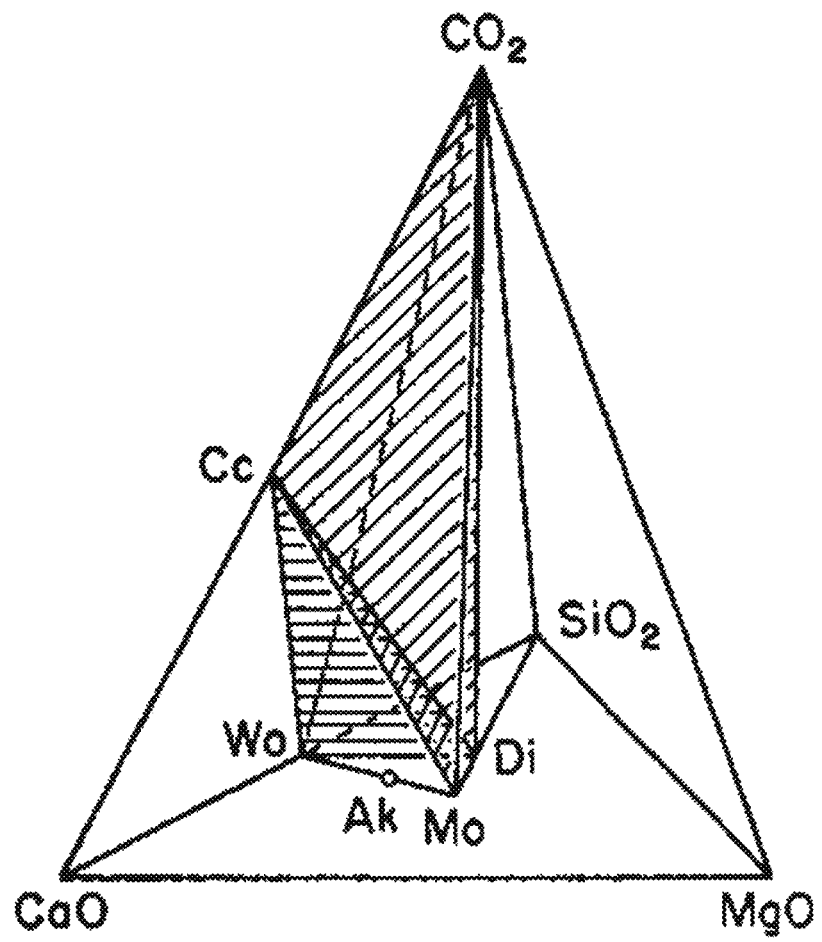
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
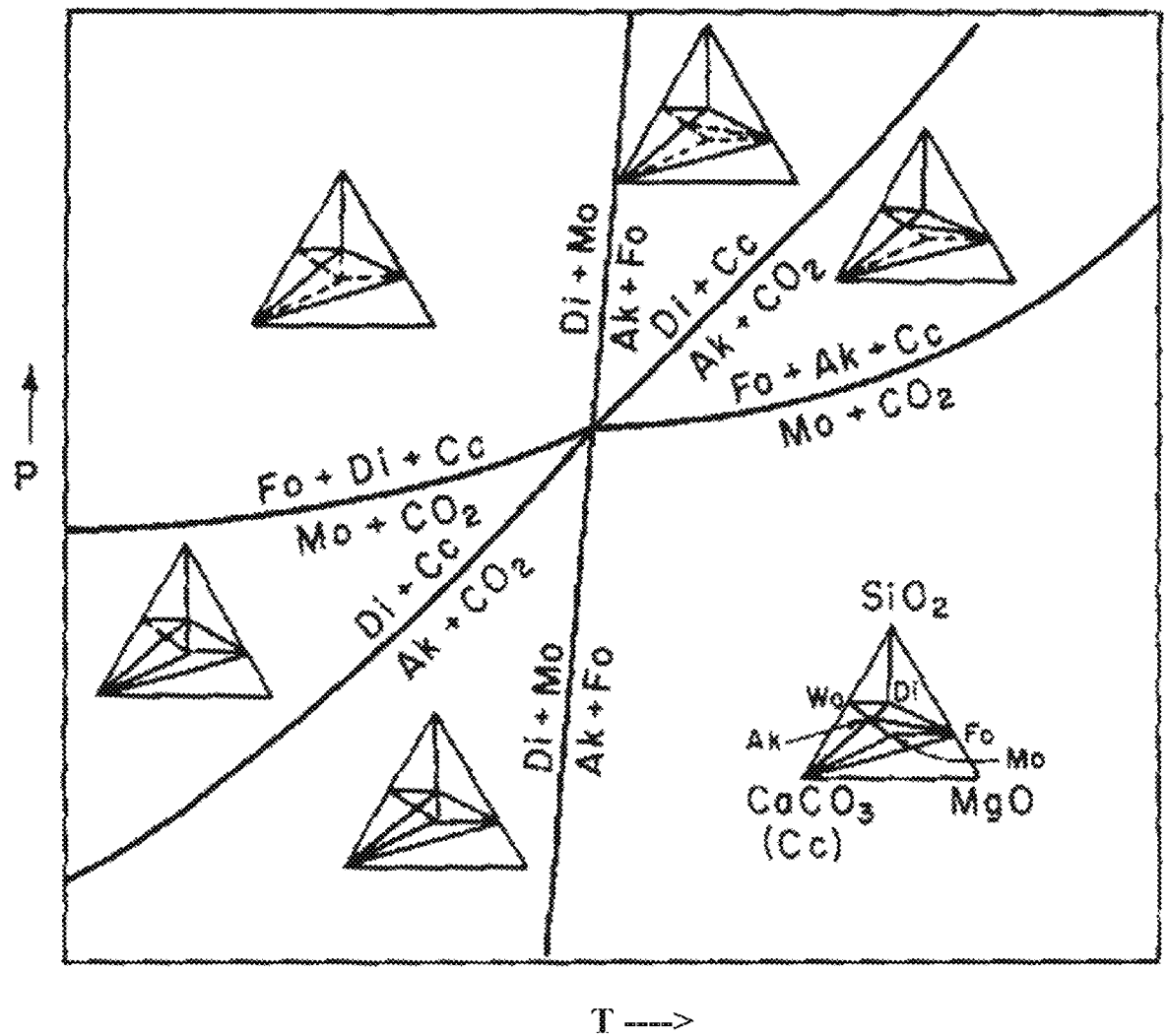
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

The invention provides novel apparatus and processes for gas flow and conditioning to achieve optimal $CO_2$ curing of articles of composite materials, with solid interior or having hollow interior ducts, channels and chambers or otherwise being hollowed out, as well as the objects so made.

Concrete products manufactured from carbonatable calcium silicate-based cements are a novel class of concrete products that can serve as a replacement for conventional concrete products made from hydraulic cements. The disclosed curing systems and processes allow more efficient and cost-effective manufacture of these unconventional concrete products as they are suitable for large-scale production with flexible equipment and production requirements. A wide variety of applications can benefit from the invention, from construction, pavements and landscaping, to infrastructure and transportation through improved energy consumption and more desirable carbon footprint.

The invention encompasses different gas circulation systems utilized for curing precast objects, such as but not limited to, pavers, blocks, hollow core slabs, roof tiles, aerated concrete blocks, made using carbonatable calcium silicate cements. The precast objects produced using carbonatable calcium silicate cements are cured by reacting the cement with carbon dioxide gas in the presence of water.

The apparatus and processes disclosed herein address a number of challenging issues faced by large scape production of precast objects from carbonatable calcium silicate cements, including but not limited to control of gas pressure gradient, flow pattern and rate, $CO_{2(g)}$ concentration gradient, control of temperature gradient, and control of humidity gradient, etc. Proper control and regulation of these factors are critical to product quality as well as scaling up of production.

Precast Objects of Carbonatable Calcium Silicate Cements

The precast objects employed here are made from carbonatable calcium silicate cements. It is noted that preferably the carbonatable calcium silicate cement compositions employed herein do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

The term "calcium silicate" material, as used herein, generally refers to naturally-occurring minerals or synthetic materials that are comprised of one or more of a group of calcium silicate phases. "Carbonatable", as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO \cdot SiO_2$). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite (($Ca,Na,K)_2[(Mg, Fe^{2+},Fe^{3+},Al,Si)_3O_7]$) and crystalline silica ($SiO_2$).

The carbonatable calcium silicate phases included in the calcium silicate composition do not hydrate when exposed to water. Due to this composites produced using a calcium silicate composition as the binding agent do not generate significant strength when combined with water. The strength generation is controlled by exposure of calcium silicate composition containing composites to specific curing regimes in the presence of $CO_2$.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 $m^2$/kg, 600 $m^2$/kg, 650 $m^2$/kg, 700 $m^2$/kg).

In exemplary embodiments of carbonation of the calcium silicate composition of the invention, ground calcium silicate particles used have a particle size having a cumulative 10% diameter greater than 1 μm in the volume distribution of the particle size distribution.

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonation of Carbonatable Calcium Silicate Cements

A major utility of the carbonatable composition is that it can be carbonated to form composite materials that are useful in a variety of application.

The following reactions are believed to take place during carbonation of calcium silicate as disclosed herein.

$$CaSiO_3(s) + CO_2(g) \rightarrow CaCO_3(s) + SiO_2(s) \quad (1)$$

$$Ca_3Si_2O_7(s) + 3CO_2(g) \rightarrow 3CaCO_3(s) + 2SiO_2(s) \quad (2)$$

$$Ca_2SiO_4(s) + 2CO_2(g) \rightarrow 2CaCO_3(s) + SiO_2(s) \quad (3)$$

Generally, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295,402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074,692), U.S. Pub. No. 2017/0102373 (application Ser. No. 15/290,328), U.S. Pub. No. 2017/0121223 (application Ser. No. 15/335,520), U.S. application Ser. No. 15/409,352, filed Jan. 18, 2017, U.S. application Ser. No. 15/449,736, filed Mar. 3, 2017, U.S. application Ser. No. 15/451,344, filed Mar. 6, 2017, U.S. application Ser. No. 15/587,705, filed May 5, 2017, each of which is expressly incorporated herein by reference in its entirety for all purposes.

FIGS. 1-8 are phase diagrams that show various phase interrelationships among some of the materials described.

Bonding Elements

The carbonation process produces a carbonated composite material that microscopically includes a plurality of bonding elements having one or more types of microstructure. Collectively, the plurality of bonding elements form an inter-connected bonding matrix creating bonding strength and holding the composite material. For example, the microstructured bonding elements may be: a bonding element comprising a core of an unreacted carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate fully or partially surrounded by a silica rich rim of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich rim of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich rim of varying thickness that is fully or partially encased by $CaCO_3$ particles; a bonding element comprising particles of partially reacted calcium silicate without a distinct core and silica rim encased by $CaCO_3$ particles; and a bonding element comprising porous particles without a distinct silica rim encased by $CaCO_3$ particles.

The silica rich rim generally displays a varying thickness within a bonding element and from bonding element to bonding element, typically ranging from about 0.01 µm to about 50 µm. In certain preferred embodiments, the silica rich rim has a thickness ranging from about 1 µm to about 25 µm. As used herein, "silica rich" generally refers to a silica content that is significant among the components of a material, for example, silica being greater than about 50% by volume. The remainder of the silica rich rim is comprised largely of $CaCO_3$, for example 10% to about 50% of $CaCO_3$ by volume. The silica rich rim may also include inert or unreacted particles, for example 10% to about 50% of melilite by volume. A silica rich rim generally displays a transition from being primarily silica to being primarily $CaCO_3$. The silica and $CaCO_3$ may be present as intermixed or discrete areas.

The silica rich rim is also characterized by a varying silica content from bonding element to bonding element, typically ranging from about 50% to about 90% by volume (e.g., from about 60% to about 80%). In certain embodiments, the silica rich rim is generally characterized by a silica content ranging from about 50% to about 90% by volume and a $CaCO_3$ content ranging from about 10% to about 50% by volume. In certain embodiments, the silica rich rim is characterized by a silica content ranging from about 70% to about 90% by volume and a $CaCO_3$ content ranging from about 10% to about 30% by volume. In certain embodiments, the silica rich rim is characterized by a silica content ranging from about 50% to about 70% by volume and a $CaCO_3$ content ranging from about 30% to about 50% by volume.

The silica rich rim may surround the core to various degrees of coverage anywhere from about 1% to about 99% (e.g., about 10% to about 90%). In certain embodiments, the silica rich rim surrounds the core with a degree of coverage less than about 10%. In certain embodiments, the silica rich rim of varying thickness surrounds the core with a degree of coverage greater than about 90%.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

The plurality of bonding elements may have any suitable mean particle size and size distribution dependent on the desired properties and performance characteristics of the composite product. In certain embodiments, for example, the plurality of bonding elements have a mean particle size in the range of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm).

The inter-connected network of bonding elements (a bonding matrix) may also include a plurality of coarse or fine filler particles that may be of any suitable material, have any suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size in the range from about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

The weight ratio of bonding elements to filler particles may be any suitable ratios dependent on the intended application for the composite material product. For example, the weight ratio of bonding elements to filler particles may be in the range from about (50 to 99): about (1 to 50), e.g., from about (60 to 99): about (1 to 40), from about (80 to 99): about (1 to 20), from about (90 to 99): about (1 to 10), from about (50 to 90): about (10 to 50), from about (50 to 70): about (30 to 50). In certain embodiments depending on the application, the weight ratio of bonding elements to filler particles may be in the range from about (10 to 50): about (50 to 90), e.g., from about (30 to 50): about (50 to 70), from about (40 to 50): about (50 to 60).

Conditioned Curing Systems and Processes

As disclosed herein, in an aspect, a process to cure a precast object includes introducing the precast product into an envelope that is capable of containing a gas (e.g., the envelope is sealed or vented). A primary gas circulation loop is provided, wherein the primary gas circulation loop includes introducing a gas (e.g., $CO_2$), at a first condition into the envelope, flowing the gas over a surface of the precast product inside the envelope to bring the gas to a second condition, passing the gas at the second condition through a primary gas conditioning system to restore the gas to its first condition, and recirculate the gas into the primary gas circulation loop.

Additionally, at least a secondary gas circulation loop is also included, wherein the secondary gas circulation loop includes: taking the gas in the envelope at a third condition, passing it through a secondary gas conditioning system to condition it to a fourth condition, and passing the gas after conditioning to the fourth condition over at least another part of the surface of the precast product. In some embodiments, a plurality of secondary gas circulation loops are present.

In some embodiments, the quantity of water required to properly form precast objects containing carbonatable calcium silicate cements is higher than the amount of water required to convert the carbonatable calcium silicates into carbonates. Thus to cure precast objects containing carbonatable silicate cements, introduction of conditioned gas into the envelope is needed to react the cement and remove excess water present with the precast object. The gas temperature and relatively humidity dictate the water removal rate. The $CO_{2(g)}$ concentration dictates the carbonation reaction rate. The gas temperature, relative humidity, and $CO_{2(g)}$ concentration should be substantially uniform through the length of the product to achieve uniform curing along the length of the envelope.

In certain embodiments, the curing process begins with a gas purging process sufficient to raise the average $CO_{2(g)}$ concentration within the envelope to greater than about 25% by volume. In certain embodiments, the average $CO_{2(g)}$ concentration is raised to about 50%-about 99.99% by volume. In some other embodiments, the average $CO_{2(g)}$ concentration is raised to about 50%-about 70%. In some other embodiments, the average $CO_{2(g)}$ concentration is raised to about 55%-about 65%. In some other embodiments, the average $CO_{2(g)}$ concentration is raised to about 65%-about 75%. In some other embodiments, the average $CO_{2(g)}$ concentration is raised to about 75%-about 99.99%. In some other embodiments, the average $CO_{2(g)}$ concentration is raised to about 90%-about 99.99%. In some other embodiments, the average $CO_{2(g)}$ concentration is raised to about 95%-about 99.99%.

Following the purge, curing can be accomplished by turning the primary gas conditioning system on to facilitate the primary gas circulation loop. This allows the introduction of conditioned gas into the envelope containing the precast object.

The gas is allowed to traverse the length of the envelope over a surface of the precast object. In some embodiments, the surface of the precast object over which the gas passes is a void inside the precast object. The gas picks up moisture from the pores of the precast object as it travels over it. This causes a gradual temperature drop and an increase on the water content in the gas as it moves through the envelope.

Figure 9:
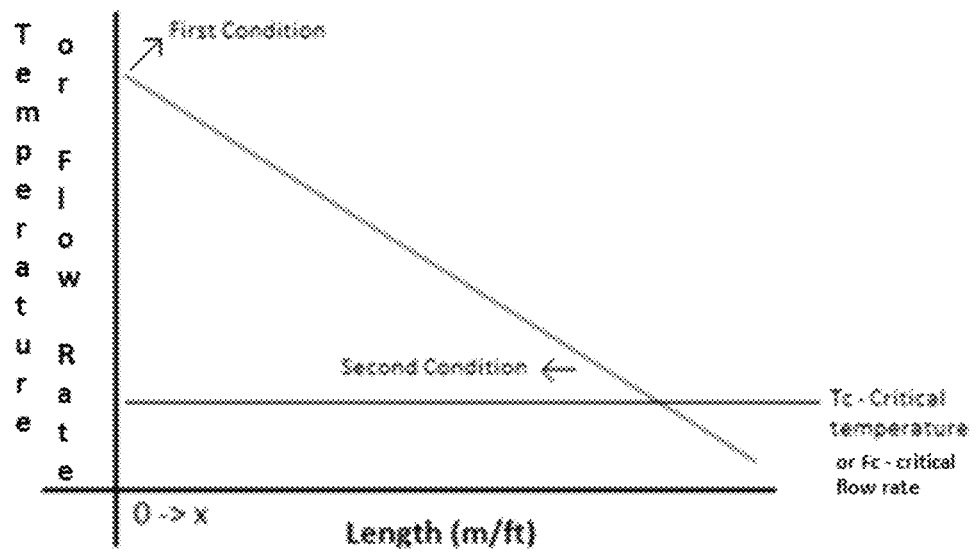
FIG. 9 illustrates temperature change along the length of the envelope indicating the gas at first condition, gas at second condition and the critical temperature below which curing is non-uniform
Figure 10:
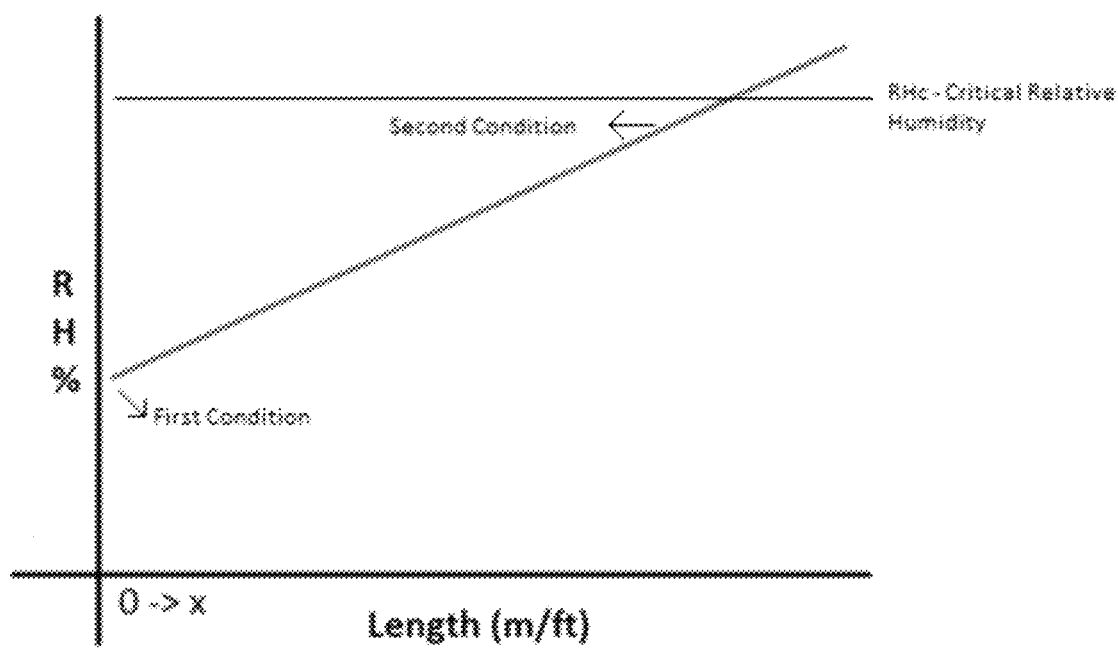
FIG. 10 illustrates changes in relative humidity of the gas along the length of the envelope

This gradual temperature drop and increase of water content in the gas is illustrated in FIG. 9 and FIG. 10. FIG. 9 shows a schematic drop of the temperature of the gas as it traverses along the length of the envelope. Also shown in the FIG. 9 is the trend the flow rate of the gas as it traverses the length of the envelope. Although the same line is used to illustrate both temperature and flow rate the scale of the y-axis used for temperature and flow rate will be different.

FIG. 10, similarly, shows the increase in the relative humidity of the gas as it transverses along the length of the envelope. The decrease in the temperature and the increase in the relative humidity eventually bring the gas to a second condition. The reduced temperature of the gas slows the carbonation reaction rate of the precast object and increases the relative humidity of the gas stream. The increased relative humidity slows the evaporation rate of water and hence the water removal process. Additionally, the flow of the gas also deteriorates to some extent in some embodiments. It is believed that this deterioration is due to the friction encountered as the gas flows over the precast concrete product that has a certain roughness.

The flow rate of the gas is also a parameter that influences the evaporation rate of water from the precast object. To cure a precast object uniformly along the length of the envelope and to achieve acceptable performance, the temperature, flow rate and relative humidity gradients along the length of the envelope must be controlled and regulated to achieve a desired evaporation rate. At no point should the gas be allowed to reach a critical point where the gas is no longer able to dry and/or cure the precast object uniformly.

The gas at the second condition is passed through a primary gas conditioning system to restore it to the first condition. Additional gas may also be added to the gas as it is passed through the primary gas conditioning system to compensate for the losses through leakage and consumption in the carbonation reaction.

Nevertheless, due to the inability of the gas to dry and/or cure the precast object uniformly after reaching the critical point, the length of the envelope that is feasible is limited. Without being held to the theory, it is believed that, amongst other things, the factors influencing the possible length of the envelope are the first condition of the gas, the composition of the precast object, the flow rate of the gas and the temperature of the precast object. After this length of the envelope has been exceeded, the condition of the gas, i.e., the gas at the second condition, is at a point below the critical point where it is no longer able to dry and/or cure the precast object.

In certain embodiments, the above-described limitation of the length of the envelope is remedied through providing at least a secondary gas circulation loop. In some embodiments, a plurality of secondary gas circulation loops are present. The secondary gas circulation loop includes: taking the gas in the envelope at a third condition, passing it through a secondary gas conditioning system to condition it to a fourth condition, and flowing the gas after conditioning to the fourth condition over at least another surface of the precast object In some embodiments, the secondary gas conditioning system includes at least a heating unit to facilitate heating of the gas that has cooled down after having passed over the surfaces of the precast object. In some embodiments, the secondary gas conditioning system includes a plurality of heating units to facilitate the heating of the gas that has cooled down after having passed over the surfaces of the precast object.

In some embodiments, the secondary gas conditioning system includes at least a dehumidification unit to remove moisture from the gas after having passed over the surfaces of the precast object. In some other embodiments the secondary gas conditioning system includes a plurality of dehumidification units to remove moisture from the gas after having passed over the surfaces of the precast object. In some embodiments, the dehumidification unit consists of a chiller and/or heat exchanger. In some other embodiments, the dehumidification unit consists a desiccant material. In some embodiments, the dehumidification unit comprises a membrane that is capable of water removal. In some embodiments, the dehumidification unit comprises a combination of the chiller and/or heat exchanger, the desiccant unit, and the membrane.

In some embodiments, the secondary gas circulation loop includes at least a fan to increase or modify the flow of the gas. In some other embodiments, the secondary gas circulation loop includes a plurality of fans to increase or modify the flow of the gas. In some embodiments, the secondary gas circulation loop has at least some of the fans configured to flow the gas in an opposite direction as compared with the other fans. In some embodiments, the gas circulation loop has at least some of the fans configured to flow the gas at a first speed while the other fans as configured to flow gas at a speed different from the first speed.

In some embodiments, each of the secondary gas circulation loops has a dedicated gas conditioning system included in it. In some other embodiments, a plurality of the gas circulation loops are connected to single secondary conditioning system. In some other embodiments, at least one of the secondary gas-conditioning systems of the secondary gas circulation loop is the same as the primary gas conditioning system of the primary gas circulation loop. In some other embodiments, the secondary gas conditioning system of the secondary gas circulation loop is the same as the primary gas conditioning system of the primary gas circulation loop.

Possible Relationships between the Gas at Fourth Condition and the Gas at First Condition In some embodiments, the fourth condition of the gas, coming out of the secondary gas conditioning system, is similar to the first condition of the gas, as provided by the primary gas conditioning system. In some other embodiments, the fourth condition of the gas, coming out of the secondary gas conditioning system, is different from the first condition of the gas, as provided by the primary gas conditioning system.

In some embodiments, the temperature of the gas at the fourth condition is higher than the temperature of the gas at the first condition. In some embodiments, the temperature of the gas at the fourth condition is lower than the temperature of the gas at the first condition. In some embodiments, the temperature of the gas at the fourth condition is similar to the temperature of the gas at the first condition.

In some embodiments, the relative humidity of the gas at the fourth condition is higher than the relative humidity of the gas at the first condition. In some embodiments, the relative humidity of the gas at the fourth condition is lower than the relative humidity of the gas at the first condition. In some embodiments, the relative humidity of the gas at the fourth condition is similar to the relative humidity of the gas at the first condition.

In some embodiments, the flow rate of the gas at the fourth condition is higher than the flow rate of the gas at the first condition. In some embodiments, the flow rate of the gas at the fourth condition is lower than the flow rate of the gas at the first condition. In some embodiments, the flow rate of the gas at the fourth condition is similar to the flow rate of the gas at the first condition.

Possible Relationships between the Gas at Third Condition and the Gas at Second Condition In some embodiments, the third condition of the gas prior to passing through the secondary gas conditioning system, is similar to the second condition of the gas taken out for passing through the primary gas conditioning system. In some embodiments, the third condition of the gas prior to passing through the secondary gas conditioning system, is different from the second condition of the gas taken out for passing through the primary gas conditioning system.

In some embodiments, the temperature of the gas at the third condition is lower than the temperature of the gas in the second condition. In some embodiments, the temperature of the gas at the third condition is higher than the temperature of the gas in the second condition. In some embodiments, the temperature of the gas at the third condition is similar to the temperature of the gas in the second condition.

In some embodiments, the relative humidity of the gas at the third condition is lower than the relative humidity of the gas in the second condition. In some embodiments, the relative humidity of the gas at the third condition is higher than the relative humidity of the gas in the second condition. In some embodiments, the relative humidity of the gas at the third condition is similar to the relative humidity of the gas in the second condition.

In some embodiments, the flow rate of the gas at the third condition is lower than the flow rate of the gas in the second condition. In some embodiments, the flow rate of the gas at the third condition is higher than the flow rate of the gas in the second condition. In some embodiments, the flow rate of the gas at the third condition is similar to the flow rate of the gas in the second condition.

Possible Relationships between the Gas at Fourth Condition and the Gas at Second Condition In some embodiments, the fourth condition of the gas, coming out of the secondary gas conditioning system, is similar to the second condition of the gas, as taken up the primary gas conditioning system. In some other embodiments, the fourth condition of the gas, coming out of the secondary gas conditioning system, is different from the second condition of the gas, as taken up by the primary gas conditioning system.

In some embodiments, the temperature of the gas at the fourth condition is higher than the temperature of the gas at the second condition. In some embodiments, the temperature of the gas at the fourth condition is lower than the temperature of the gas at the second condition. In some embodiments, the temperature of the gas at the fourth condition is similar to the temperature of the gas at the second condition.

In some embodiments, the relative humidity of the gas at the fourth condition is higher than the relative humidity of the gas at the second condition. In some embodiments, the relative humidity of the gas at the fourth condition is lower than the relative humidity of the gas at the second condition. In some embodiments, the relative humidity of the gas at the fourth condition is similar to the relative humidity of the gas at the second condition.

In some embodiments, the flow rate of the gas at the fourth condition is higher than the flow rate of the gas at the second condition. In some embodiments, the flow rate of the gas at the fourth condition is lower than the flow rate of the gas at the second condition. In some embodiments, the flow rate of the gas at the fourth condition is similar to the flow rate of the gas at the second condition.

Possible Relationships between the Gas at First Condition and the Gas at Third Condition In some embodiments, the first condition of the gas, coming out of the primary gas conditioning system, is similar to the third condition of the gas, as taken up the secondary gas conditioning system. In some other embodiments, the first condition of the gas, coming out of the primary gas conditioning system, is different from the third condition of the gas, as taken up by the secondary gas conditioning system.

In some embodiments, the temperature of the gas at the first condition is higher than the temperature of the gas at the third condition. In some embodiments, the temperature of the gas at the first condition is similar to the temperature of the gas at the third condition. In some embodiments, the temperature of the gas at the first condition is lower than the temperature of the gas at the third condition.

In some embodiments, the relative humidity of the gas at the first condition is higher than the relative humidity of the gas at the third condition. In some embodiments, the relative humidity of the gas at the first condition is similar to the relative humidity of the gas at the third condition. In some embodiments, the relative humidity of the gas at the first condition is lower than the relative humidity of the gas at the third condition.

In some embodiments, the flow rate of the gas at the first condition is higher than the flow rate of the gas at the third condition. In some embodiments, the flow rate of the gas at the first condition is lower than the flow rate of the gas at the third condition. In some embodiments, the flow rate of the gas at the first condition is similar to the flow rate of the gas at the third condition.

Possible Relationships between the Gas at Third Condition and the Gas at Fourth Condition In some embodiments, the third condition of the gas, as taken up by the secondary gas conditioning system, is similar to the fourth condition of the gas, coming out of the secondary gas conditioning system. In some embodiments, the third condition of the gas, as taken up by the secondary gas conditioning system, is different the fourth condition of the gas, coming out of the secondary gas conditioning system.

In some embodiments, the temperature of the gas at the third condition is lower than the temperature of the gas at the fourth condition. In some embodiments, the temperature of the gas at the third condition is higher than the temperature of the gas at the fourth condition. In some embodiments, the temperature of the gas at the third condition is similar to the temperature of the gas at the fourth condition.

In some embodiments, the relative humidity of the gas at the third condition is higher than the relative humidity of the gas at the fourth condition. In some embodiments, the relative humidity of the gas at the third condition is similar to the relative humidity of the gas at the fourth condition. In some embodiments, the relative humidity of the gas at the third condition is lower than the relative humidity of the gas at the fourth condition.

In some embodiments, the flow rate of the gas at the third condition is higher than the flow rate of the gas at the fourth condition. In some embodiments, the flow rate of the gas at the third condition is lower than the flow rate of the gas at the fourth condition. In some embodiments, the flow rate of the gas at the third condition is similar to the flow rate of the gas at the fourth condition.

As noted above, the temperature, relative humidity and flow rate are controlled to attain a uniform evaporation rate along the length of the envelope.

In some embodiments, the evaporation rate for water removal from the precast object is between 1 kg/hr/mton to 100 kg/hr/mton. In some embodiments, the evaporation rate for water removal from the precast object is between about 1 kg/hr/mton to about 50 kg/hr/mton. In some embodiments, the evaporation rate for water removal from the precast object is between about 1 kg/hr/mton to about 40 kg/hr/mton. In some embodiments, the evaporation rate for water removal from the precast object is between about 1 kg/hr/mton to about 30 kg/hr/mton. In some embodiments, the evaporation rate for water removal from the precast object is between about 1 kg/hr/mton to about 20 kg/hr/mton. In some embodiments, the evaporation rate for water removal from the precast object is between about 1 kg/hr/mton to about 10 kg/hr/mton. In some embodiments, the evaporation rate for water removal from the precast object is between about 5 kg/hr/mton to about 40 kg/hr/mton. In some embodiments, the evaporation rate for water removal from the precast object is between about 5 kg/hr/mton to about 30 kg/hr/mton. In some embodiments, the evaporation rate for water removal from the precast object is between about 5 kg/hr/mton to about 20 kg/hr/mton. In some embodiments, the evaporation rate for water removal from the precast object is between about 5 kg/hr/mton to about 10 kg/hr/mton.

For attaining the above ranges of the evaporation rates, the temperature of the gas at the first condition, second condition, third condition and fourth condition is controlled.

In some embodiments, the temperature of the gas at the first condition is between about 20° C. to about 99° C. In some embodiments, the temperature of the gas at the first condition is between about 50° C. to about 90° C. In some embodiments, the temperature of the gas at the first condition is between about 60° C. to about 90° C. In some embodiments, the temperature of the gas at the first condition is between about 70° C. to about 90° C. In some embodiments, the temperature of the gas at the first condition is between about 80° C. to about 90° C. In some embodiments, the temperature of the gas at the first condition is between about 50° C. to about 85° C. In some embodiments, the temperature of the gas at the first condition is between about 60° C. to about 85° C. In some embodiments, the temperature of the gas at the first condition is between about 70° C. to about 85° C. In some embodiments, the temperature of the gas at the first condition is between about 80° C. to about 85° C. In some embodiments, the temperature of the gas at the first condition is between about 50° C. to about 80° C. In some embodiments, the temperature of the gas at the first condition is between about 60° C. to about 80° C. In some embodiments, the temperature of the gas at the first condition is between about 70° C. to about 80° C. In some embodiments, the temperature of the gas at the first condition is between about 50° C. to about 75° C. In some embodiments, the temperature of the gas at the first condition is between about 60° C. to about 75° C. In some embodiments, the temperature of the gas at the first condition is between about 70° C. to about 75° C. In some embodiments, the temperature of the gas at the first condition is between about 50° C. to about 70° C. In some embodiments, the temperature of the gas at the first condition is between 60° C. to about 70° C.

In some embodiments, the temperature of the gas at the second condition is between about 20° C. to about 99° C. In some embodiments, the temperature of the gas at the second condition is between about 30° C. to about 90° C. In some embodiments, the temperature of the gas at the second condition is between about 40° C. to about 90° C. In some embodiments, the temperature of the gas at the second condition is between about 50° C. to about 90° C. In some embodiments, the temperature of the gas at the second condition is between about 60° C. to about 90° C. In some embodiments, the temperature of the gas at the second condition is between about 70° C. to about 90° C. In some embodiments, the temperature of the gas at the second condition is between about 80° C. to about 90° C. In some embodiments, the temperature of the gas at the second condition is between about 30° C. to about 85° C. In some embodiments, the temperature of the gas at the second condition is between about 40° C. to about 85° C. In some embodiments, the temperature of the gas at the second condition is between about 50° C. to about 85° C. In some embodiments, the temperature of the gas at the second condition is between about 60° C. to about 85° C. In some embodiments, the temperature of the gas at the second condition is between about 70° C. to about 85° C. In some embodiments, the temperature of the gas at the second condition is between about 80° C. to about 85° C. In some embodiments, the temperature of the gas at the second condition is between about 30° C. to about 80° C. In some embodiments, the temperature of the gas at the second condition is between about 40° C. to about 80° C. In some embodiments, the temperature of the gas at the second condition is between about 50° C. to about 80° C. In some embodiments, the temperature of the gas at the second condition is between about 60° C. to about 80° C. In some embodiments, the temperature of the gas at the second condition is between about 70° C. to about 80° C. In some embodiments, the temperature of the gas at the second condition is between about 30° C. to about 75° C. In some embodiments, the temperature of the gas at the second condition is between about 40° C. to about 75° C. In some embodiments, the temperature of the gas at the second condition is between about 50° C. to about 75° C. In some embodiments, the temperature of the gas at the second condition is between about 60° C. to about 75° C. In some embodiments, the temperature of the gas at the second condition is between about 70° C. to about 75° C. In some embodiments, the temperature of the gas at the second condition is between about 50° C. to about 70° C. In some embodiments, the temperature of the gas at the second condition is between about 60° C. to about 70° C.

In some embodiments, the temperature of the gas at the third condition is between about 20° C. to about 99° C. In some embodiments, the temperature of the gas at the third condition is between about 30° C. to about 90° C. In some embodiments, the temperature of the gas at the third condition is between about 40° C. to about 90° C. In some embodiments, the temperature of the gas at the third condition is between about 50° C. to about 90° C. In some embodiments, the temperature of the gas at the third condition is between about 60° C. to about 90° C. In some embodiments, the temperature of the gas at the third condition is between about 70° C. to about 90° C. In some embodiments, the temperature of the gas at the third condition is between about 80° C. to about 90° C. In some embodiments, the temperature of the gas at the third condition is between about 30° C. to about 85° C. In some embodiments, the temperature of the gas at the third condition is between about 40° C. to about 85° C. In some embodiments, the temperature of the gas at the third condition is between about 50° C. to about 85° C. In some embodiments, the temperature of the gas at the third condition is between about 60° C. to about 85° C. In some embodiments, the temperature of the gas at the third condition is between about 70° C. to about 85° C. In some embodiments, the temperature of the gas at the third condition is between about 80° C. to about 85° C. In some embodiments, the temperature of the gas at the third condition is between about 30° C. to about 80° C. In some embodiments, the temperature of the gas at the third condition is between about 40° C. to about 80° C. In some embodiments, the temperature of the gas at the third condition is between about 50° C. to about 80° C. In some embodiments, the temperature of the gas at the third condition is between about 60° C. to about 80° C. In some embodiments, the temperature of the gas at the third condition is between about 70° C. to about 80° C. In some embodiments, the temperature of the gas at the third condition is between about 30° C. to about 75° C. In some embodiments, the temperature of the gas at the third condition is between about 40° C. to about 75° C. In some embodiments, the temperature of the gas at the third condition is between about 50° C. to about 75° C. In some embodiments, the temperature of the gas at the third condition is between about 60° C. to about 75° C. In some embodiments, the temperature of the gas at the third condition is between about 70° C. to about 75° C. In some embodiments, the temperature of the gas at the third condition is between about 50° C. to about 70° C. In some embodiments, the temperature of the gas at the third condition is between about 60° C. to about 70° C.

In some embodiments, the temperature of the gas at the fourth condition is between about 20° C. to about 99° C. In some embodiments, the temperature of the gas at the fourth condition is between about 50° C. to about 90° C. In some embodiments, the temperature of the gas at the fourth condition is between about 60° C. to about 90° C. In some embodiments, the temperature of the gas at the fourth condition is between about 70° C. to about 90° C. In some embodiments, the temperature of the gas at the fourth condition is between about 80° C. to about 90° C. In some embodiments, the temperature of the gas at the fourth condition is between about 50° C. to about 85° C. In some embodiments, the temperature of the gas at the fourth condition is between about 60° C. to about 85° C. In some embodiments, the temperature of the gas at the fourth condition is between about 70° C. to about 85° C. In some embodiments, the temperature of the gas at the fourth condition is between about 80° C. to about 85° C. In some embodiments, the temperature of the gas at the fourth condition is between about 50° C. to about 80° C. In some embodiments, the temperature of the gas at the fourth condition is between about 60° C. to about 80° C. In some embodiments, the temperature of the gas at the fourth condition is between about 70° C. to about 80° C. In some embodiments, the temperature of the gas at the fourth condition is between about 50° C. to about 75° C. In some embodiments, the temperature of the gas at the fourth condition is between about 60° C. to about 75° C. In some embodiments, the temperature of the gas at the fourth condition is between about 70° C. to about 75° C. In some embodiments, the temperature of the gas at the fourth condition is between about 50° C. to about 70° C. In some embodiments, the temperature of the gas at the fourth condition is between about 60° C. to about 70° C.

For attaining the above ranges of the evaporation rate the temperature of the gas at the first condition, second condition, third condition and fourth condition is controlled.

In some embodiments, the relative humidity of the gas at the first condition is between about 0.1% to about 99%. In some embodiments, the relative humidity of the gas at the first condition is between about 0.1% to about 10%. In some embodiments, the relative humidity of the gas at the first condition is between about 0.1% to about 20%. In some embodiments, the relative humidity of the gas at the first condition is between about 0.1% to about 30%. In some embodiments, the relative humidity of the gas at the first condition is between about 0.1% to about 40%. In some embodiments, the relative humidity of the gas at the first condition is between 0.1% to about 50%. In some embodiments, the relative humidity of the gas at the first condition is between about 0.1% to about 60%. In some embodiments, the relative humidity of the gas at the first condition is between about 0.1% to about 70%. In some embodiments, the relative humidity of the gas at the first condition is between about 0.1% to about 80%. In some embodiments, the relative humidity of the gas at the first condition is between about 0.1% to about 90%. In some embodiments, the relative humidity of the gas at the first condition is between about 0.1% to about 99%. In some embodiments, the relative humidity of the gas at the first condition is between about 10% to about 20%. In some embodiments, the relative humidity of the gas at the first condition is between 10% to about 30%. In some embodiments, the relative humidity of the gas at the first condition is between about 10% to about 40%. In some embodiments, the relative humidity of the gas at the first condition is between about 10% to about 50%. In some embodiments, the relative humidity of the gas at the first condition is between about 10% to about 60%. In some embodiments, the relative humidity of the gas at the first condition is between about 10% to about 70%. In some embodiments, the relative humidity of the gas at the first condition is between about 10% to about 80%. In some embodiments, the relative humidity of the gas at the first condition is about between 10% to about 90%. In some embodiments, the relative humidity of the gas at the first condition is between about 10% to 99 about %. In some embodiments, the relative humidity of the gas at the first condition is between about 20% to about 30%. In some embodiments, the relative humidity of the gas at the first condition is between about 20% to about 40%. In some embodiments, the relative humidity of the gas at the first condition is between about 20% to about 50%. In some embodiments, the relative humidity of the gas at the first condition is between about 20% to about 60%. In some embodiments, the relative humidity of the gas at the first condition is between about 20% to about 70%. In some embodiments, the relative humidity of the gas at the first condition is between about 20% to about 80%. In some embodiments, the relative humidity of the gas at the first condition is between about 20% to about 90%. In some embodiments, the relative humidity of the gas at the first condition is between about 20% to about 99%. In some embodiments, the relative humidity of the gas at the first condition is between about 30% to about 40%. In some embodiments, the relative humidity of the gas at the first condition is between about 30% to about 50%. In some embodiments, the relative humidity of the gas at the first condition is between about 30% to about 60%. In some embodiments, the relative humidity of the gas at the first condition is between about 30% to about 70%. In some embodiments, the relative humidity of the gas at the first condition is between about 30% to about 80%. In some embodiments, the relative humidity of the gas at the first condition is between about 30% to about 90%. In some embodiments, the relative humidity of the gas at the first condition is between about 30% to about 99%. In some embodiments, the relative humidity of the gas at the first condition is between about 40% to about 50%. In some embodiments, the relative humidity of the gas at the first condition is between about 40% to about 60%. In some embodiments, the relative humidity of the gas at the first condition is between about 40% to about 70%. In some embodiments, the relative humidity of the gas at the first condition is between about 40% to about 80%. In some embodiments, the relative humidity of the gas at the first condition is between about 40% to about 90%. In some embodiments, the relative humidity of the gas at the first condition is between about 40% to about 99%. In some embodiments, the relative humidity of the gas at the first condition is between about 50% to about 60%. In some embodiments, the relative humidity of the gas at the first condition is between about 50% to about 70%. In some embodiments, the relative humidity of the gas at the first condition is between about 50% to about 80%. In some embodiments, the relative humidity of the gas at the first condition is between about 50% to about 90%. n some embodiments, the relative humidity of the gas at the first condition is between about 50% to about 99%.

In some embodiments, the relative humidity of the gas at the second condition is between about 0.1% to about 99%. In some embodiments, the relative humidity of the gas at the second condition is between about 10% to about 99%. In some embodiments, the relative humidity of the gas at the second condition is between about 20% to about 99%. In some embodiments, the relative humidity of the gas at the second condition is between about 30% to about 99%. In some embodiments, the relative humidity of the gas at the second condition is between about 40% to about 99%. In some embodiments, the relative humidity of the gas at the second condition is between about 50% to about 99%. In some embodiments, the relative humidity of the gas at the second condition is between about 60% to about 99%. In some embodiments, the relative humidity of the gas at the second condition is between about 70% to about 99%. In some embodiments, the relative humidity of the gas at the second condition is between about 80% to about 99%. In some embodiments, the relative humidity of the gas at the second condition is between about 90% to about 99%.

In some embodiments, the relative humidity of the gas at the third condition is between about 0.1% to about 99%. In some embodiments, the relative humidity of the gas at the third condition is between about 10% to about 99%. In some embodiments, the relative humidity of the gas at the third condition is between about 20% to about 99%. In some embodiments, the relative humidity of the gas at the third condition is between about 30% to about 99%. In some embodiments, the relative humidity of the gas at the third condition is between about 40% to about 99%. In some embodiments, the relative humidity of the gas at the third condition is between about 50% to about 99%. In some embodiments, the relative humidity of the gas at the third condition is between about 60% to about 99%. In some embodiments, the relative humidity of the gas at the third condition is between about 70% to about 99%. In some embodiments, the relative humidity of the gas at the third condition is between about 80% to about 99%. In some embodiments, the relative humidity of the gas at the third condition is between about 90% to about 99%.

In some embodiments, the relative humidity of the gas at the fourth condition is between about 0.1% to about 99%. In some embodiments, the relative humidity of the gas at the fourth condition is between about 0.1% to about 10%. In some embodiments, the relative humidity of the gas at the fourth condition is between about 0.1% to about 20%. In some embodiments, the relative humidity of the gas at the fourth condition is between about 0.1% to about 30%. In some embodiments, the relative humidity of the gas at the fourth condition is between about 0.1% to about 40%. In some embodiments, the relative humidity of the gas at the fourth condition is between about 0.1% to about 50%. In some embodiments, the relative humidity of the gas at the fourth condition is between about 0.1% to about 60%. In some embodiments, the relative humidity of the gas at the fourth condition is between about 0.1% to about 70%. In some embodiments, the relative humidity of the gas at the fourth condition is between about 0.1% to about 80%. In some embodiments, the relative humidity of the gas at the fourth condition is between about 0.1% to about 90%. In some embodiments, the relative humidity of the gas at the fourth condition is between about 0.1% to about 99%. In some embodiments, the relative humidity of the gas at the fourth condition is between about 10% to about 20%. In some embodiments, the relative humidity of the gas at the fourth condition is between about 10% to about 30%. In some embodiments, the relative humidity of the gas at the fourth condition is between about 10% to about 40%. In some embodiments, the relative humidity of the gas at the fourth condition is between about 10% to about 50%. In some embodiments, the relative humidity of the gas at the fourth condition is between about 10% to about 60%. In some embodiments, the relative humidity of the gas at the fourth condition is between about 10% to about 70%. In some embodiments, the relative humidity of the gas at the fourth condition is between about 10% to about 80%. In some embodiments, the relative humidity of the gas at the fourth condition is between about 10% to about 90%. In some embodiments, the relative humidity of the gas at the fourth condition is between about 10% to about 99%. In some embodiments, the relative humidity of the gas at the fourth condition is between about 20% to about 30%. In some embodiments, the relative humidity of the gas at the fourth condition is between about 20% to about 40%. In some embodiments, the relative humidity of the gas at the fourth condition is between about 20% to about 50%. In some embodiments, the relative humidity of the gas at the fourth condition is between about 20% to about 60%. In some embodiments, the relative humidity of the gas at the fourth condition is between about 20% to about 70%. In some embodiments, the relative humidity of the gas at the fourth condition is between about 20% to about 80%. In some embodiments, the relative humidity of the gas at the fourth condition is between about 20% to about 90%. In some embodiments, the relative humidity of the gas at the fourth condition is between about 20% to about 99%. In some embodiments, the relative humidity of the gas at the fourth condition is between about 30% to about 40%. In some embodiments, the relative humidity of the gas at the fourth condition is between about 30% to about 50%. In some embodiments, the relative humidity of the gas at the fourth condition is between about 30% to about 60%. In some embodiments, the relative humidity of the gas at the fourth condition is between about 30% to about 70%. In some embodiments, the relative humidity of the gas at the fourth condition is between about 30% to about 80%. In some embodiments, the relative humidity of the gas at the fourth condition is between about 30% to about 90%. In some embodiments, the relative humidity of the gas at the fourth condition is between about 30% to about 99%. In some embodiments, the relative humidity of the gas at the fourth condition is between about 40% to about 50%. In some embodiments, the relative humidity of the gas at the fourth condition is between about 40% to about 60%. In some embodiments, the relative humidity of the gas at the fourth condition is between about 40% to about 70%. In some embodiments, the relative humidity of the gas at the fourth condition is between about 40% to about 80%. In some embodiments, the relative humidity of the gas at the fourth condition is between about 40% to about 90%. In some embodiments, the relative humidity of the gas at the fourth condition is between about 40% to about 99%. In some embodiments, the relative humidity of the gas at the fourth condition is between about 50% to about 60%. In some embodiments, the relative humidity of the gas at the fourth condition is between about 50% to about 70%. In some embodiments, the relative humidity of the gas at the fourth condition is between about 50% to about 80%. In some embodiments, the relative humidity of the gas at the fourth condition is between about 50% to about 90%. In some embodiments, the relative humidity of the gas at the fourth condition is between about 50% to about 99%.

The flow rate of the gas at the first condition, second condition, third condition and fourth condition are adjusted and regulated in accordance with the temperature and relative humidity of the gas at those conditions to attain an evaporation rate in the ranges specified above.

Figure 11:
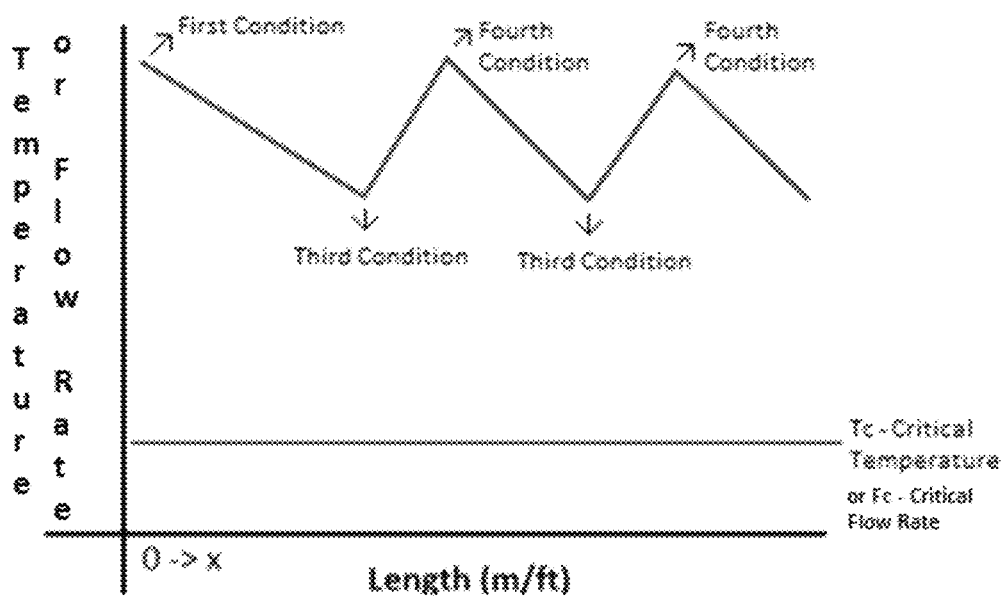
FIG. 11 shows a schematic for temperature and flow rate as a function of length of the envelope having a secondary gas circulation loop.
Figure 12:
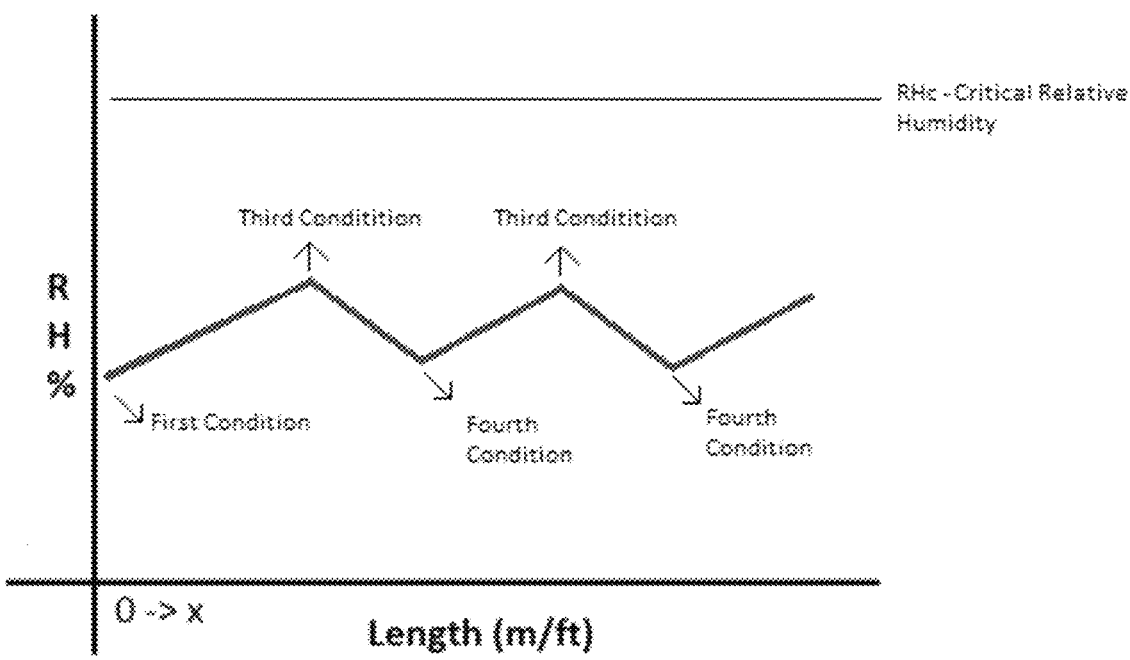
FIG. 12 shows a schematic for relative humidity as a function of length of the envelope having a secondary gas circulation loop.

Using the secondary gas conditioning system, the gas that was taken at a third condition is refreshed by heating, adjusting the flow rate and/or dehumidification. This is schematically illustrated in FIG. 11 and FIG. 12. Although the same line is used to depict both temperature and flow rate in FIG. 11, the scale of the y-axis used for temperature and flow rate will be different. FIG. 11 and FIG. 12 show the gas being extracted at a third condition and passed through the secondary gas conditioning loop to bring to a fourth condition. After the gas is at the fourth condition, it is flowed over another surface of the precast object to dry and/or carbonate that part of the precast object in the envelope.

In some embodiments, the surface and the another surface of the precast object to be cured includes, but is not limited to, surfaces of pavers, surfaces of blocks, surfaces of roof tiles, surfaces of rail road ties, surfaces of hollow core slabs.

In some embodiments, when possible, vibro-cast precast objects, such as, pavers, blocks, and roof tiles may be stacked in shelves on a rack to improve the shop floor space utilization. The racks with the precast objects may be placed adjacent to each other along the length and breadth of the envelope. Using the primary circulation loop and the secondary circulation loops, as described above, both the breadth and length of the envelope can be extended to any desired length to accommodate the footprint limitations at customer sites. The ability to be flexible in shop floor utilization through the flexibility of the footprint of the envelope is a significant advantage that enables ubiquitous adoption of this technology.

Similarly, hollow core slabs are formed via vibro-compaction using an extruder. Typically, the hollow core slabs have voids, in the form of interior channels, which run along the length of the extruded part. Often, the hollow core slabs have more than one interior channel along the width of the extruded part. In some embodiments, the hollow core slab may have about 4 to about 10 channels (e.g., 4, 5, 6, 7, 8, 9, 10 channels) along the width of the extruded part. The hollow core slab is often cast onto a casting element that may be heated. The slab is then enclosed within a tarp over the casting element. In some embodiments the enclosure is gas tight. In some embodiments, the enclosure may be vented. Thus, the envelope comprising the interior channels and a volume of air surrounding the slab is created. The additional heat from the casting element reduces the drop in temperature of the gas as it traverses the length of the enclosure. This helps increase the length of slab where the gas can be utilized prior to reaching a condition that is beyond the critical point.

The gas at the first condition, defined by its temperature, flow rate and composition, can be introduced into the primary circulation loop of the envelope in multiple ways. In some embodiments, the gas can be introduced directly through the voids in the precast object. In hollow core slabs the channels of the hollow core slab can form an internal envelope volume. In some embodiments, the gas can also be introduced from the top or sides of the precast object. In the hollow core slab application, sides of the hollow core slab and the top surface provide an external envelope volume. Additionally, in some embodiments, the gas can be introduced from the bottom of the envelope as well. In the hollow core application, gas can be introduced from the bottom through the casting bed. These gas delivery systems may be used independently or in combination depending on the requirements of the product and the manufacturing site.

The gas can be similarly removed from the envelope. The gas can be removed directly from the both the internal envelope volume, from the external envelope volume, or from the bottom of the envelope.

As described above, the removed gas at the second condition has to be conditioned to remove water vapor and increase its temperature. The reconditioned gas is then recirculated along with any additional make up gas to account for gas lost to the reaction process or system leakage, thereby creating a continuous primary gas circulation loop. When designing the primary gas circulation loop, it is desirable to maintain the temperature and relative humidity within a specified range along the length of the envelope.

In some embodiments, additional distribution mechanisms may be affixed to the gas delivery systems to aid in creating a uniform process condition along the length of the envelope. These additional distribution mechanisms consist of perforated tubes traversing the length of the envelope to distribute gas in the internal or external envelope volumes.

In an aspect, a process for curing a precast object includes: introducing the precast object into an envelope that is capable of containing a gas, wherein the envelope is sealed or vented; providing a primary gas circulation loop, wherein the primary gas circulation loop comprises introducing a gas such as carbon dioxide, at a first condition into the envelope, flowing the gas over a surface of the precast object inside the envelope to bring the gas to a second condition, passing the gas at the second condition through a primary gas conditioning system to restore the gas to its first condition, and recirculate the gas into the primary gas circulation loop; and wherein the primary gas conditioning system includes flowing the gas at a first flow rate over a heating unit to increase the temperature of the gas and flowing the gas through a dehumidification unit, at a second flow rate to reduce the relative humidity.

In some embodiments, passing the gas over the surface of the precast object comprises flowing the gas through a void inside the precast object. In some embodiments, the precast object is a hollow core slab containing a plurality of channels running along the length of the hollow core slab.

In some embodiments, the flow of gas at a first speed over the heater and the flow of gas through a dehumidification unit at a second speed are configured in a parallel setup.

In some other embodiments, the flow in the primary gas circulation loop changes direction during curing of the precast object.

Conditioned Curing Apparatus

In an aspect, the invention generally relates to an apparatus for curing a precast object. The apparatus includes: an envelope that is capable of containing a gas, wherein the envelope configured to sealable or ventable; a primary gas circulation loop connected to the envelope, wherein the primary gas circulation loop comprises one or more primary gas conditioning systems capable of conditioning the gas at a second condition to restore the gas to a first condition; one or more secondary gas circulation loops, wherein the secondary gas circulation loop comprises one or more secondary gas conditioning systems to condition the gas at a third condition to a fourth condition.

In certain embodiments, at least one of the secondary gas conditioning system of the secondary gas circulation loop is located within the envelope. In certain embodiments, the apparatus includes a plurality of secondary gas circulation loops.

In certain embodiments, the secondary gas conditioning system and the primary gas conditioning system are the same system. In certain embodiments, the secondary gas conditioning system and the primary gas conditioning system are different systems.

In certain embodiments, the secondary gas conditioning system comprises at least a heating unit. In certain embodiments, the secondary gas conditioning system comprises a plurality of heating units.

In certain embodiments, the secondary gas circulation loop comprises at least a fan. In certain embodiments, the secondary gas circulation loop comprises a plurality of fans. In certain embodiments, the secondary gas circulation loop has at least some of the fans configured to flow the gas in an opposite direction as compared with the other fans. In certain embodiments, the secondary gas circulation loop has at least some of the fans configured to flow a gas at a first speed while the other fans as configured to flow a gas at a speed different from the first speed.

In certain embodiments, the secondary gas conditioning system comprises a dehumidification unit. In certain embodiments, the dehumidification unit comprises a chiller, a desiccant, a membrane capable of moisture removal, or a combination of two or more thereof.

Inlet and Outlet of the Primary Gas Circulation Loop

Inlet and outlet of the primary gas circulation loop perform the function of inputting the gas at the first condition into the envelope or take out the gas from the envelope at the second gas condition, respectively.

Figure 13:
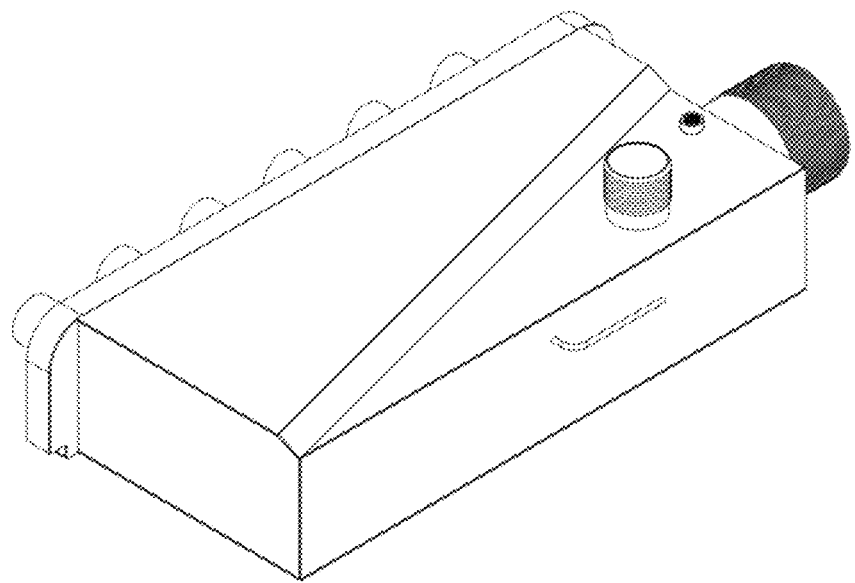
FIG. 13 shows an embodiment of an inlet of the primary gas circulation loop.
Figure 14:
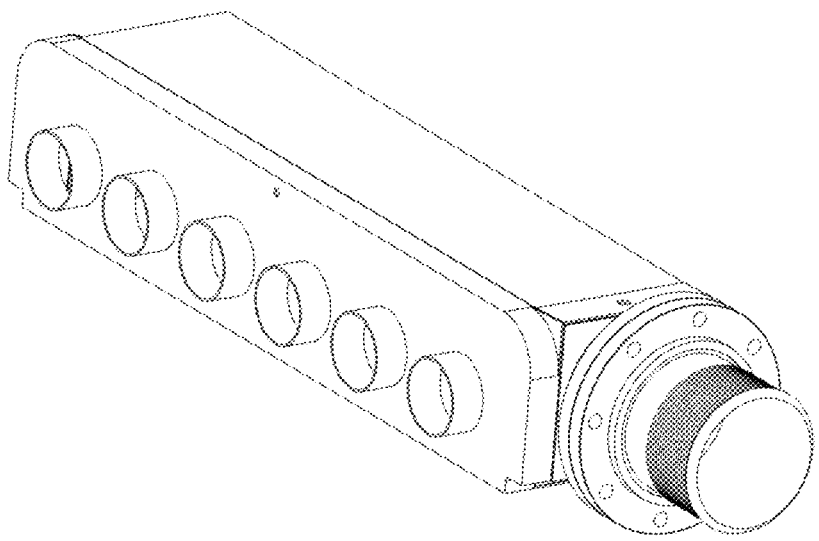
FIG. 14 shows an embodiment of an outlet of the primary gas circulation loop.

FIG. 13 shows an embodiment of the inlet typically used in the hollow core application. FIG. 14 shows an embodiment of the outlet typically used in the hollow core application.

Figure 15:
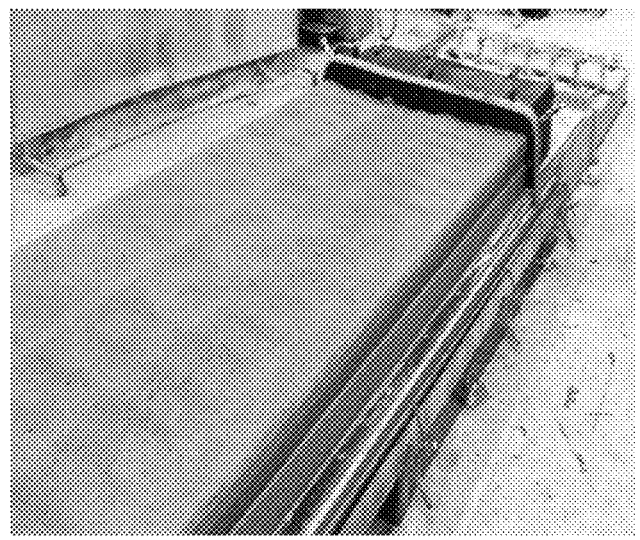
FIG. 15 shows an embodiment of an extruded hollow core with inlet installed.
Figure 16:
FIG. 16 shows an embodiment of an inlet and outlet installed on a hollow core along with an envelope using a sealed tarp for curing a 6-meter/20-feet long hollow core slab.

For the hollow core slabs, the inlet and outlet are positioned at the ends of the slab and sealed with a tarp to form an envelope enclosing the bed. FIG. 15 shows the extruded hollow core slab with the inlet installed. FIG. 16 shows the hollow core slab with the inlet and outlet installed along with the envelope formed using the tarp. Using this basic setup, hollow core slabs up to about 6-meter/20-foot long can be cured. Due to the deterioration of the gas conditions along the length of the envelope, larger sections may not be cured uniformly and uncured product is obtained.

The inlet and outlets of a primary gas circulation loop consist of a base that lies on the casting bed, and ducts that face each one of the channels of the slab. The inlet and outlet may also be designed to allow flow on top of the slab and on its sides, which can be achieved by including slits on the top or sides of the inlets and outlets which direct gas across the top or side surfaces of the slab. Circular holes at the top and sides of the inlets and outlets can be utilized instead of slits.

For longer hollow core slabs, inlet and outlets can be used in combination with perforated hoses and/or perforated pipes as shown in FIGS. 17-22.

Figure 17:
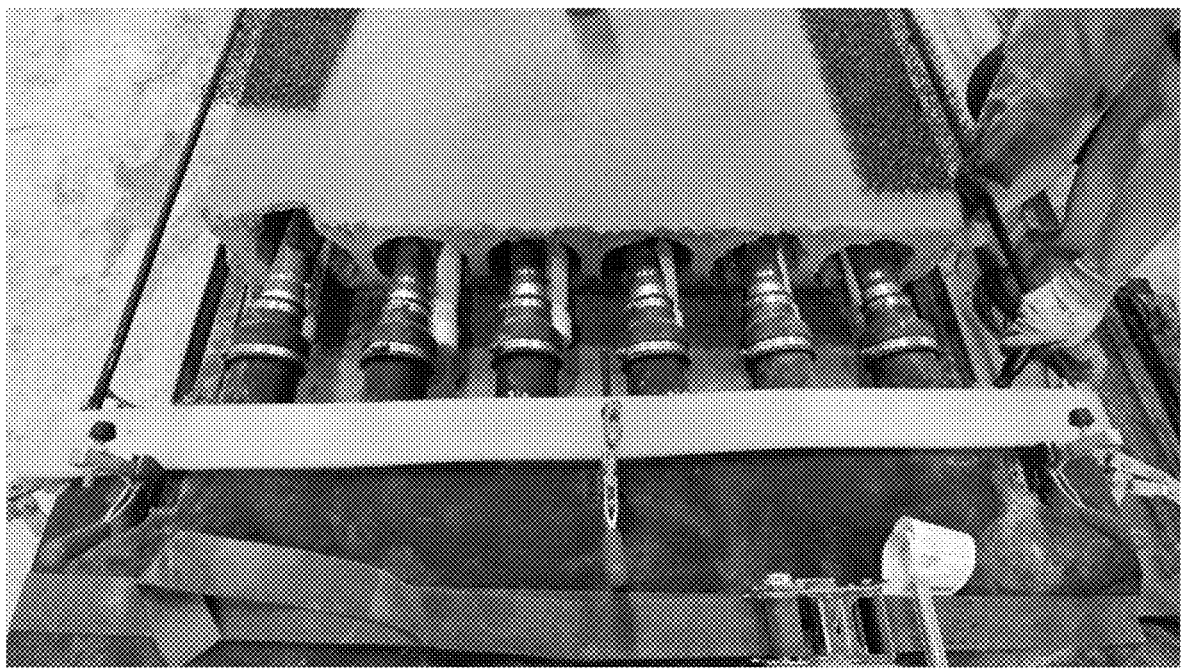
FIG. 17 shows an embodiment of hoses and pipes to deliver and remove gas. Shown here is the inlet view.
Figure 18:
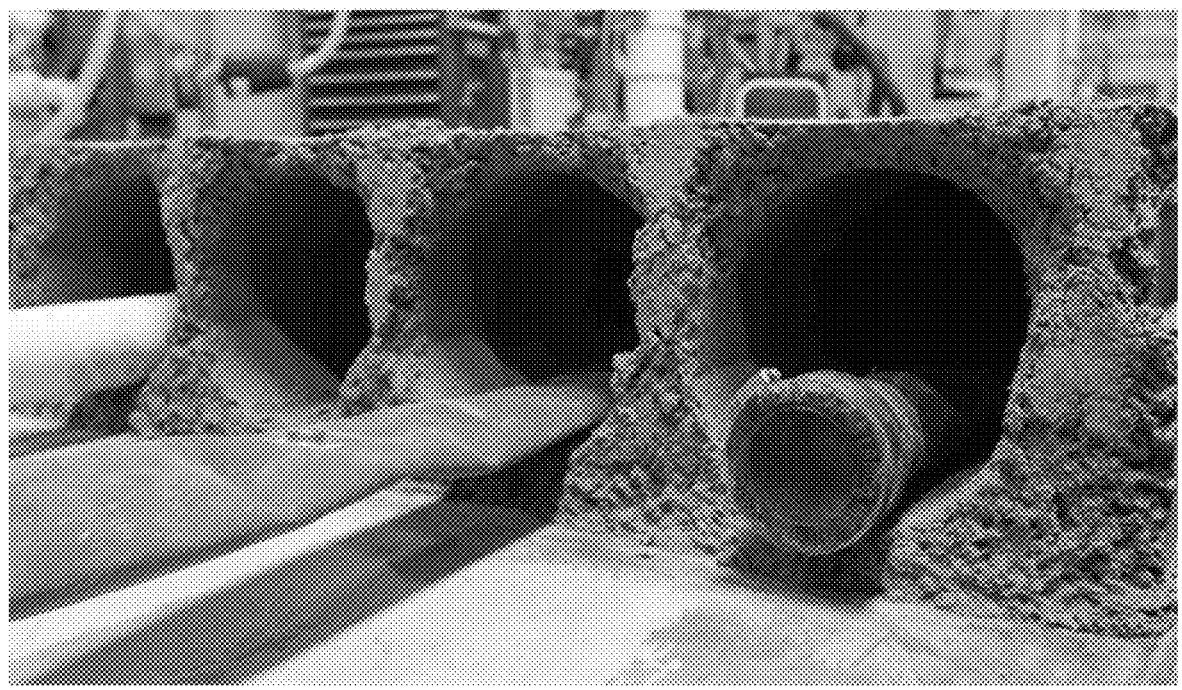
FIG. 18 shows an embodiment of hoses as delivery system being inserted.
Figure 19:
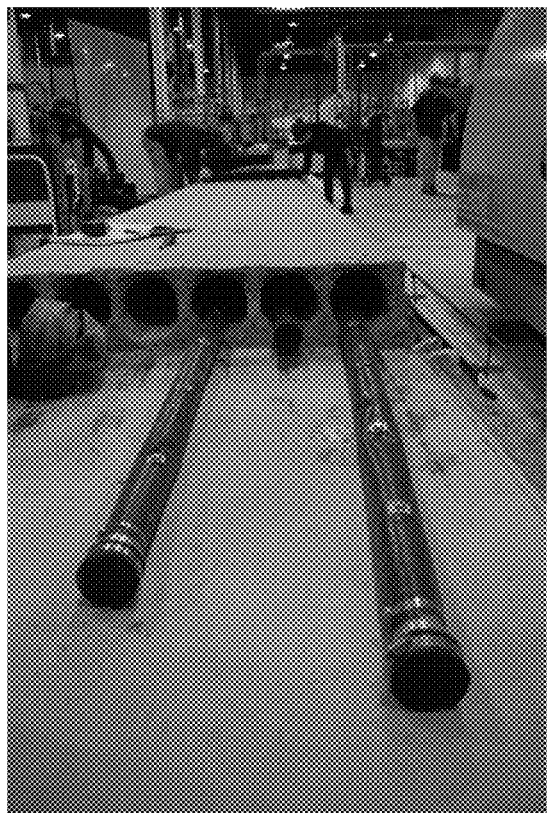
FIG. 19 shows an embodiment of hoses as delivery system being removed.
Figure 20:
FIG. 20 shows an embodiment of hoses as delivery system outlet view.
Figure 21:
FIG. 21 shows an embodiment of hoses as delivery system side view.
Figure 22:
FIG. 22 shows an embodiment of an inlet and outlet system along with envelope for curing a 15-meter/50-foot long hollow core slab.

FIG. 17 shows an embodiment of hoses and pipes for delivering and removing gas. FIG. 17 shows the inlet view. FIG. 18 shows a view where hoses, used as an aid to the gas delivery system, are being inserted within the hollow core slab channels. FIG. 19 shows a view wherein the hoses are being removed from the channels of the hollow core slab after the curing cycle. FIG. 20 shows the outlets for removing gas from the envelope. FIG. 21 shows the view of the hoses inside the channels of a hollow core slab. FIG. 22 shows the inlet, outlet and envelope used for curing a 15-meter long hollow core slab.

Using the set-up shown in FIGS. 17-22, substantially uniform gas conditions throughout hollow core slabs up to around 15 meters/50 feet (e.g., from about 10 to 15 meters) can be attained. The maximum length that can be cured can be influenced by the separation between the holes and their diameter. Additionally, the composition of the concrete, specifically, its moisture content, along with the diameter of the channels also influence the gradient of the gas condition observed in the channels, thereby, influencing the length of the slab that can be cured uniformly.

While the primary recirculation loop facilitates the distribution and conditioning of gas throughout the entire envelope, the total length of the envelope that can be attained is limited. Because of this, the total number of precast objects stacked on racks along the length or breadth of the envelope is limited. The length of the hollow core slab that can be processed is similarly limited. As the gas traverses the length of the envelope, the temperature of the gas drops and the relative humidity increases as the water is extracted from the precast object by evaporation. This causes the condition of the gas to become below the critical point shown in FIG. 9 and FIG. 10. The application of heat from the casting bed, specifically in the case of heated hollow core casting beds, is expected to increase the length of the slab where the gas can be utilized without reaching the critical point. The increase to the length of the slab that can be realized from casting bed heat input is limited. Furthermore, the increase in the length of envelope expected through the use of additional distribution mechanisms, such as perforated tubes traversing the internal or external envelope volume is also modest.

Currently, hollow core slabs are produced in sections greater than 100 meters long. It is necessary to cure these sections under one envelope to maximize the utilization of the final product and facilitate the ability to cut sections as desired by the end user. Additionally, implementation of additional distribution mechanisms such as the perforated tubes traversing the internal envelope volume, i.e., the channels within the hollow core is a time-consuming operation that adds costs through increased operation and set-up time. The set-up and removal after curing of internal perforated tubes are shown in FIG. 18 and FIG. 19, respectively.

Figure 23:
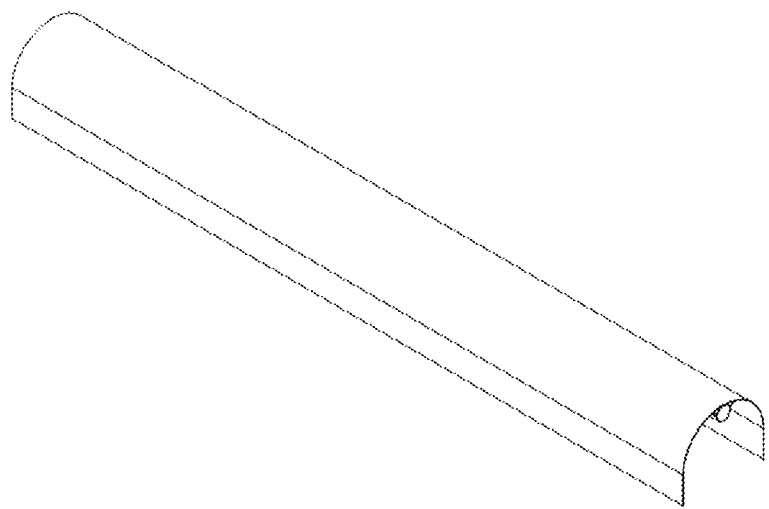
FIG. 23 shows an embodiment of tarp as delivery system: tubular inlets/outlets.
Figure 24:
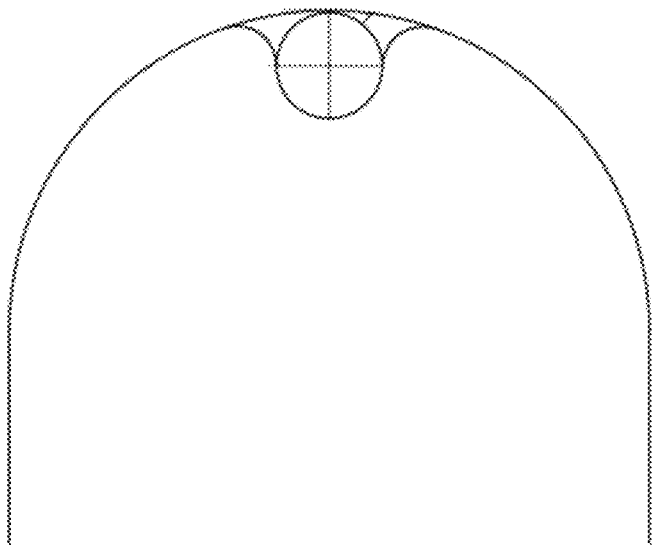
FIG. 24 shows an embodiment of side view of tarp with one inlet/outlet.
Figure 25:
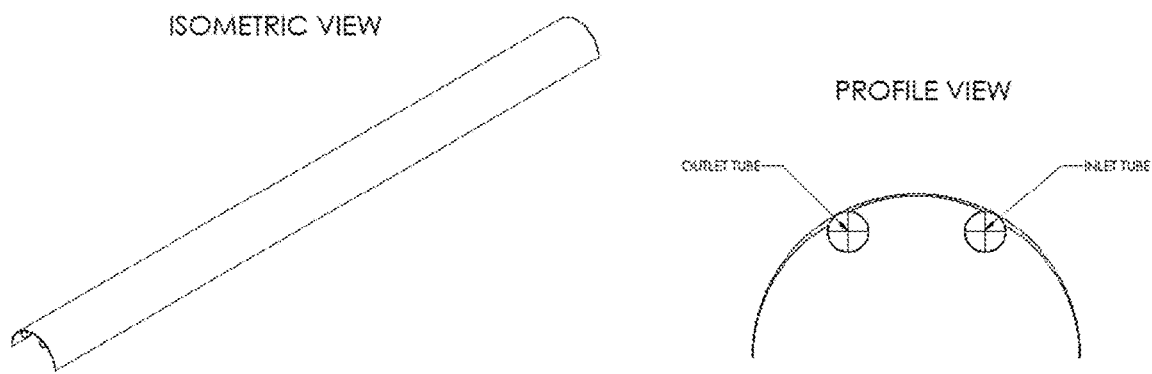
FIG. 25 shows an embodiment of tarp as delivery system: multiple tubes.
Figure 26:
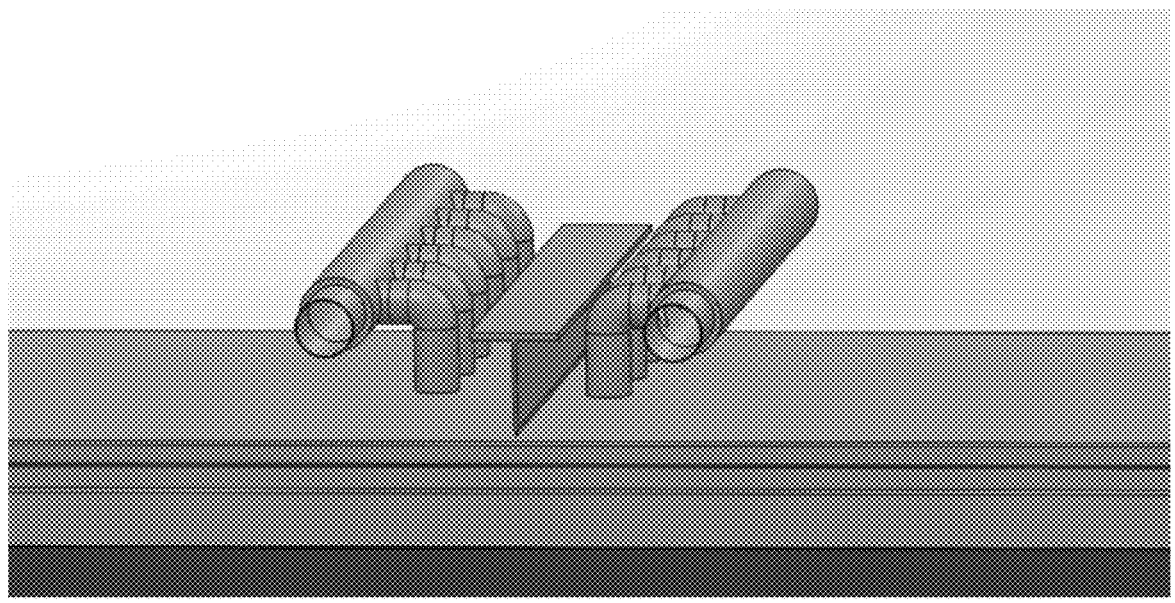
FIG. 26 shows an embodiment of a plenum that is separated into 3 parts outside the hollow core before insertion.
Figure 27:
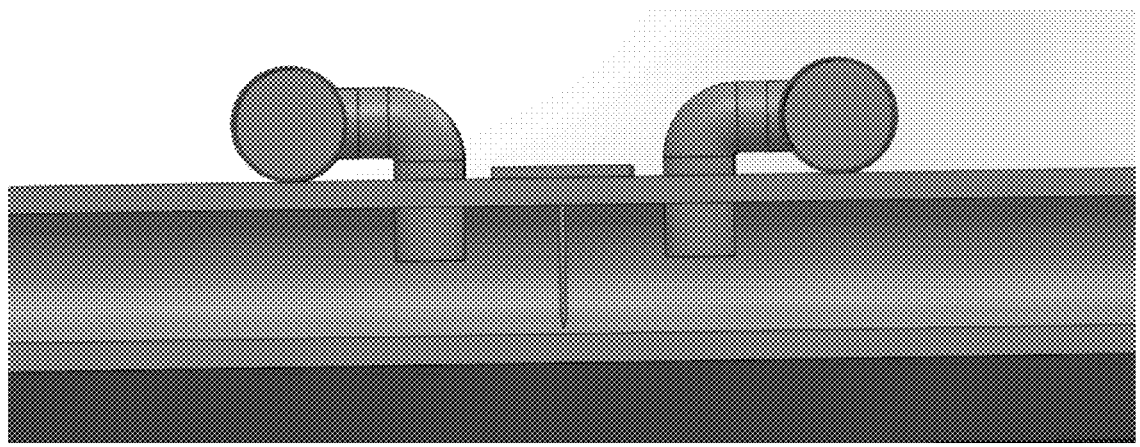
FIG. 27 shows an embodiment of the plenum of FIG. 18 after installation onto the hollow core slab.
Figure 28:
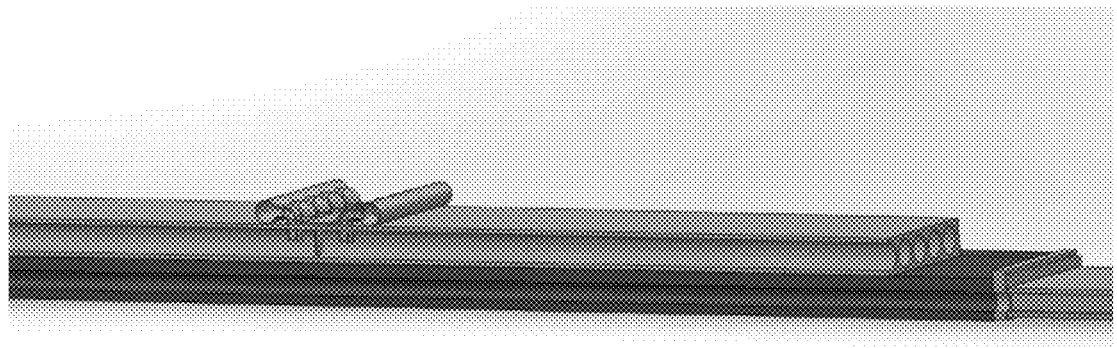
FIG. 28 shows an embodiment of side view of the plenum shown in FIG. 19.
Figure 29:
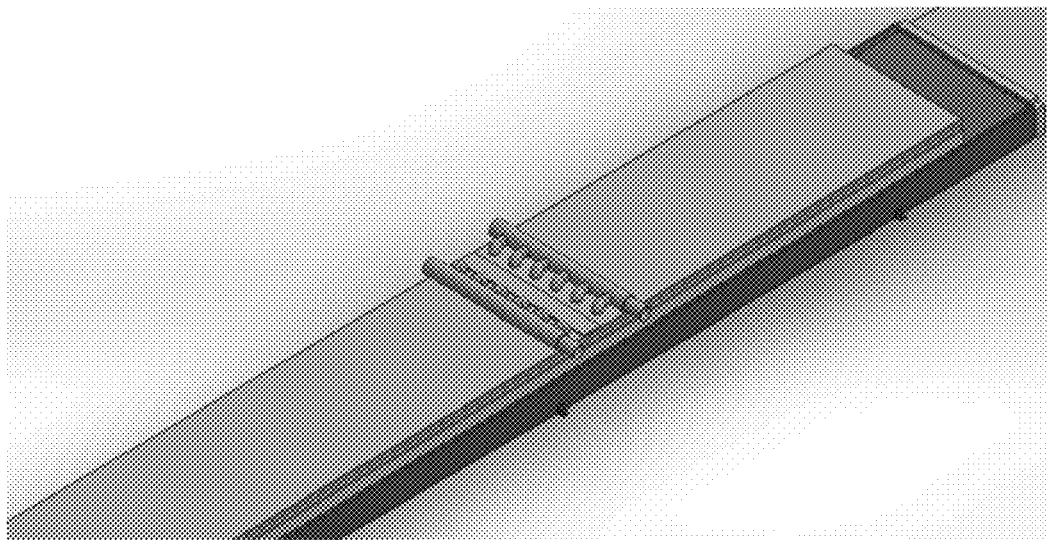
FIG. 29 shows an embodiment of top close up of the plenum shown in FIG. 19.
Figure 30:
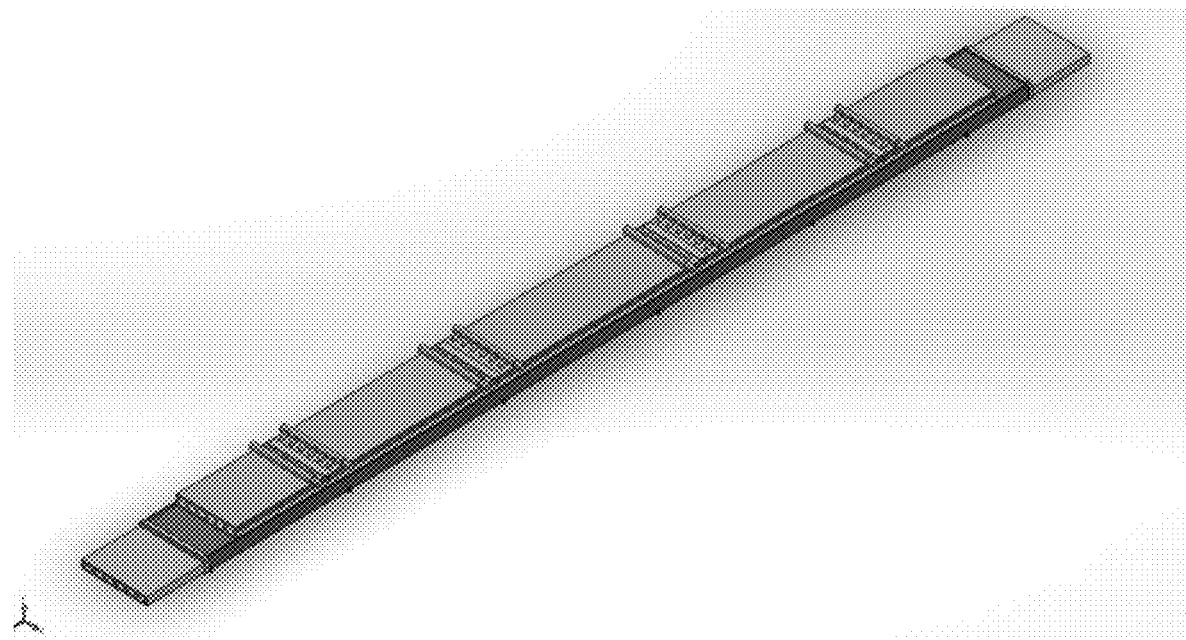
FIG. 30 shows an embodiment of multiple plenums shown in FIG. 19, setup to cure long hollow core slabs.

The envelope formed by a sealing tarp may be used as an inlet and/or outlet as shown in FIGS. 23-25. This is done by attaching one or multiple perforated tubes to the inlet at one end where the gas enters at a first condition and to the outlet at the other end where the gas has attained the second condition after traversing the length of the envelope. The tube is attached to the top or side of the sealing tarp. The diameter of the tubes, the perforations, and the separation between the perforations depend on the desired flow rate required for the system.

The casting bed or the floor of the envelope may also be used as a gas inlet. In some embodiments, tubes carrying the heated gas may be installed underneath the bed, taking advantage of the heating mechanism of the casting bed or the floor of the envelope to maintain the gas temperature. The casting bed or the floor of the envelope may then be perforated throughout its length to allow the gas to flow through it; the diameter of the perforations and the separation between them depend of the desired flow rate for the system.

Including at least one secondary gas circulation loop facilitates the distribution and recondition of gas between the internal envelope volume and external envelope volume. This secondary gas circulation loop includes taking the gas in the envelope at a third condition, and passing it through a secondary gas conditioning system to condition it to a fourth condition. Additionally, the secondary gas circulation loop also includes flowing the gas after conditioning to the fourth condition over at least another surface of the precast object.

Through the use of the secondary gas circulation loop the ability to process any length of hollow core slab is realized.

The Envelope

An envelope is provided to ensure that the gas does not escape. The envelope may be vented or sealed gas tight, depending on the application.

In the curing of the precast object such as, pavers, blocks, roof tiles, rail roads ties, hollow core slabs, etc., the envelope is provided by a chamber or enclosure within which the parts are placed for curing. In some of the embodiments, in this envelope the parts may be placed in racks on shelves to maximize the space utilization. These racks with the precast objects may be placed adjacent to one another, i.e., placed in front of each other or placed next to each other.

In some embodiments, the envelope is provided by a chamber built from a metal, an alloy, a plastic, a composite material, or a combination of two or more thereof. In some embodiments, the envelope is insulated to minimize temperature losses and facilitate better control of the gas conditions within the envelope.

In some embodiments, the envelope is made with a sheet of a material impermeable to carbon dioxide. The sheets of this carbon dioxide impervious material are used to fully seal the envelope. In the hollow core application, for example, the sides of the casting bed and the inlets and outlets at each of the hollow core ends are all enclosed within such a sealing tarp as shown in FIGS. 16-22. In some embodiments, the tarp may be insulated depending on the needs of the specific set up.

In some embodiments, the tarp may include one or multiple perforated tubes to carry the carbon dioxide into and/or out of the gas envelope around the hollow core slab. The diameter of the tubes, the perforations, and the separation between the perforations depend on the desired flow rate to be supplied into the system.

In some embodiments, a gas delivery system in the form of a tube that runs along the length of the envelope and the envelope is made of a material that cannot support its own weight and/or the weight the tube, supports have to be attached throughout the length of the envelope and to both ends of the envelope. In some embodiments, the supports throughout the length are attached to the ground. In some other embodiments, the supports are a part of the envelope itself.

Figure 43:
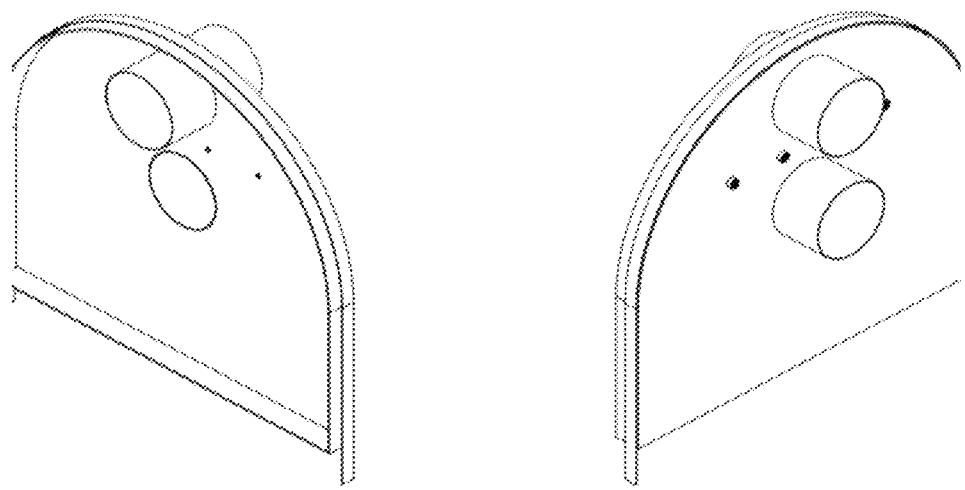
FIG. 43 shows an embodiment of end supports for sealing tarp.
Figure 44:
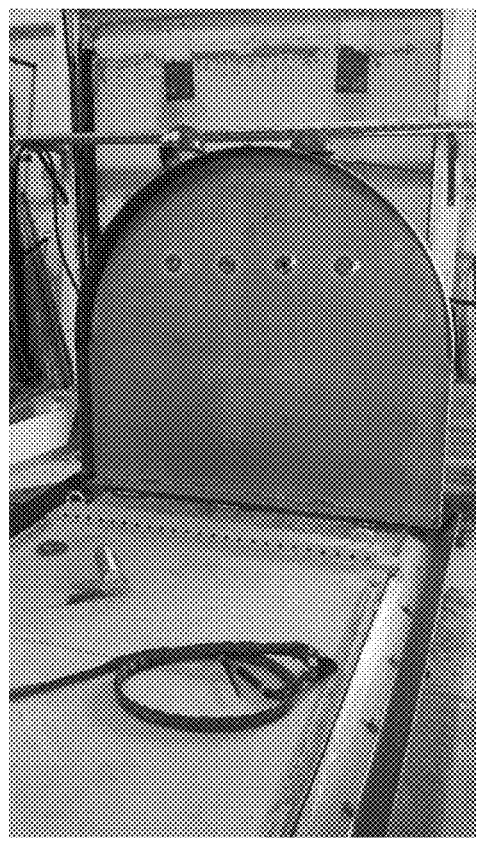
FIG. 44 shows an embodiment of end support for sealing tarp.

In some embodiments, supports are used at the end of the envelope. In the embodiments, where supports are used at the end of the envelope, inlet and outlet ports are required. These, for example, are shown in FIG. 43 and FIG. 44. In some embodiments, sensor ports for pressure, relative humidity, temperature and carbon dioxide concentration are also provided in the envelope. The tubes inside of the envelope may be parallel or perpendicular to the end supports.

Plenums for the Secondary Gas Circulation Loop

Plenums for secondary gas circulation loop are openings positioned within the envelope. The function of the plenums for the secondary gas circulation loop is to take the gas in the envelope at a third condition, that is different or similar from the first condition and pass it through a secondary gas conditioning system to condition it to a fourth condition. Once the gas has been conditioned to a fourth condition it is used to flow over at least another surface of the precast object.

In some embodiments, when the precast object is a hollow core slab, the plenums are metal, plastic or composite material (or a combination thereof) based fixtures deployed by insertion on to the hollow core slab surface. The placement of the plenums facilitating the secondary gas circulation loop renders the curing process is length independent. In some embodiments, multiple plenums are placed at different positions of the slab to cure hollow core slabs. In some specific embodiments, the spacing between these plenums is around 15 meters. In some specific embodiments, the spacing between these plenums is greater than 15 meters but less than 100 meters (e.g., about 20, 30, 40, 50, 60, 70, 80, 90 meters). FIGS. 26-40, show the various types of plenums that can be used for promoting the secondary gas circulation loop.

In some embodiments, the plenums may only perform one role of either injection or gas removal as shown in FIGS. 26-30. A splitter is also shown in these images that is used to prevent the gas from the side of injection to mix with the gas from the side of gas removal. The splitter, used in some embodiments, also aids the installation of the plenum into the hollow core. In some embodiments, the splitter on the plenum is cut out into a tooth-like arrangement. When a plenum with a splitter is used, care must be taken avoid contact with the reinforcement of the hollow core slab.

Figure 31:
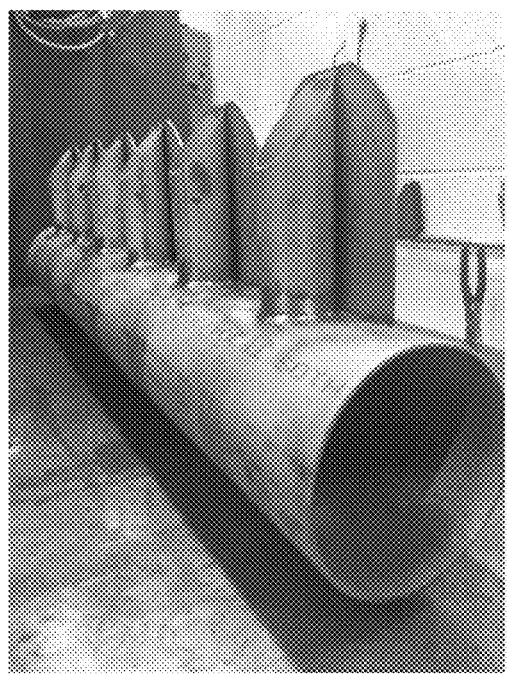
FIG. 31 shows an embodiment of a two-part plenum: injection combined with splitter.
Figure 32:
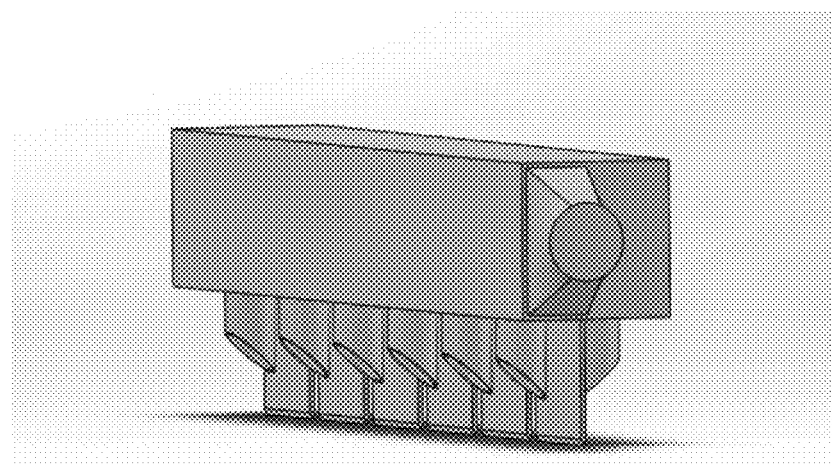
FIG. 32 shows an embodiment of a plenum: three parts combined: injection, gas removal, and splitter.
Figure 33:
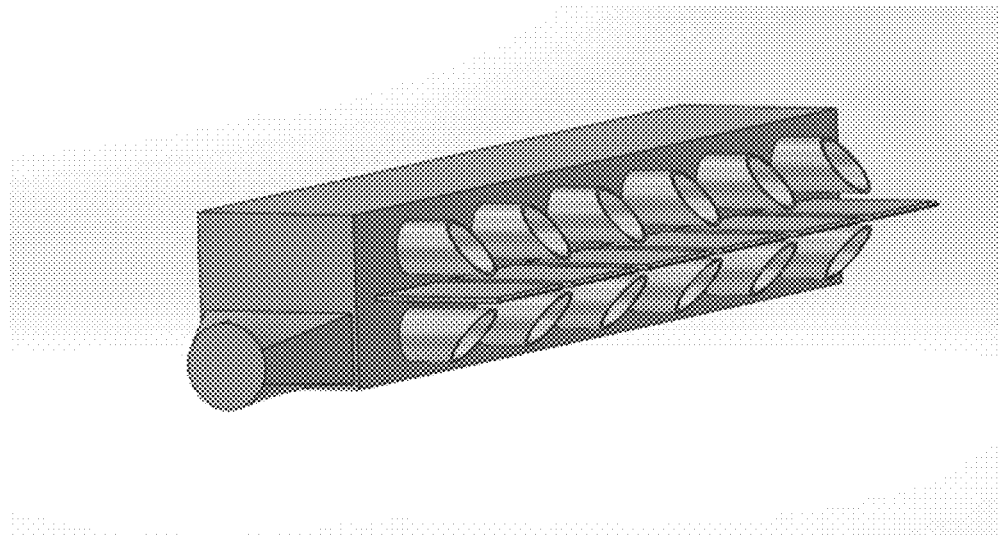
FIG. 33 shows an embodiment of side view of a plenum: three parts combined injection, gas removal and splitter.

FIG. 31 shows the plenum with an injector combined with the splitter. FIG. 32 and FIG. 33 show a plenum having all the three parts integrated. In one plenum, the injection, gas removal and splitter are present.

Figure 34:
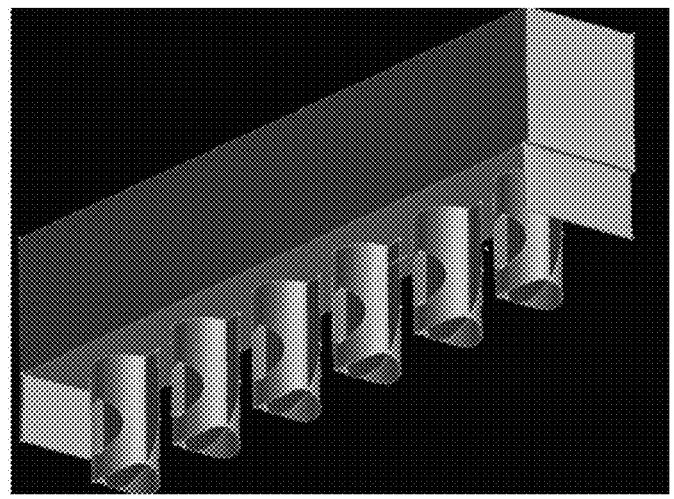
FIG. 34 shows an embodiment of a plenum: dual tube, one tube for gas injection and removal.
Figure 35:
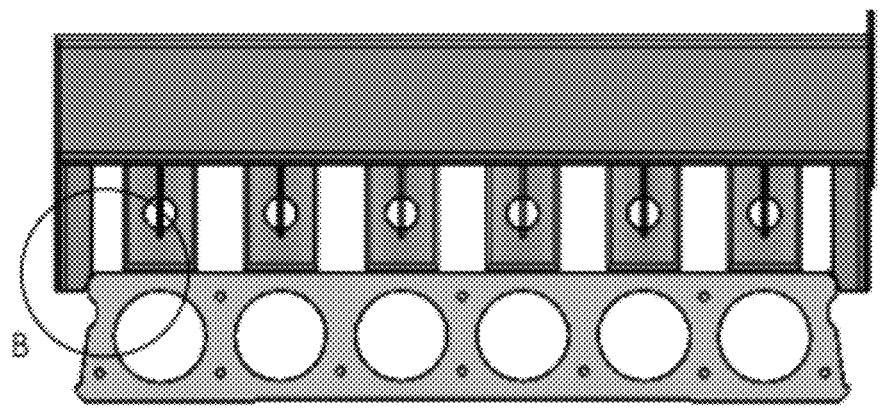
FIG. 35 shows an embodiment of a plenum: initial contact.
Figure 36:
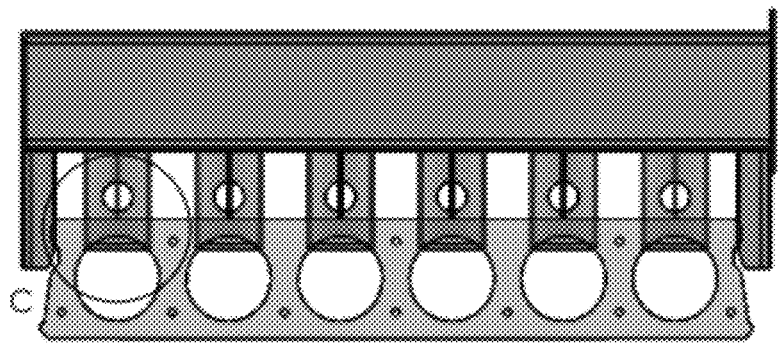
FIG. 36 shows an embodiment of a plenum: vane contact.
Figure 37:
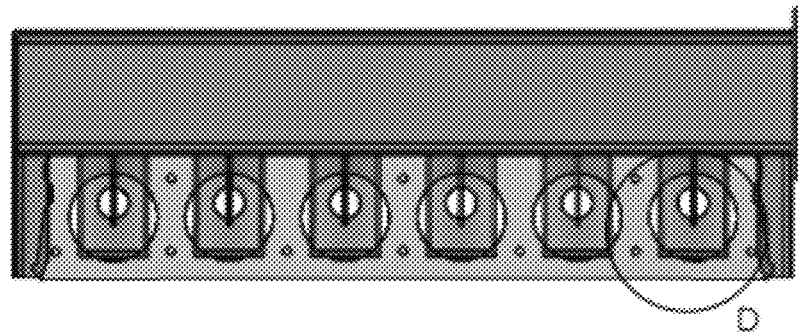
FIG. 37 shows an embodiment of a plenum: full insertion.

FIG. 34 shows a plenum where the injector and the gas removal are accomplished by the same opening in the plenum wherein the splitter acts as a partition between the opening. FIGS. 35-37 show the method of using the plenum shown in FIG. 34 in a hollow core slab.

Figure 38:
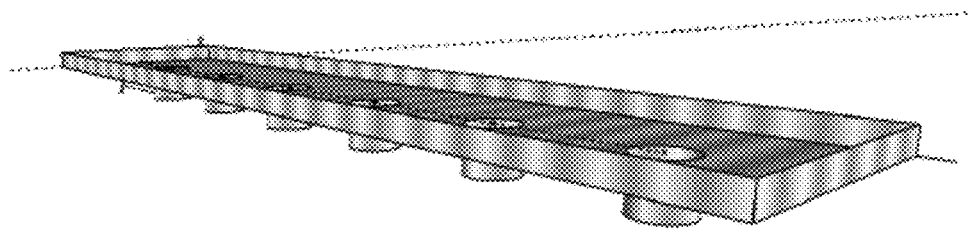
FIG. 38 shows an embodiment of a plenum with a base plate (top) with removable lid (bottom) drawings.
Figure 38:
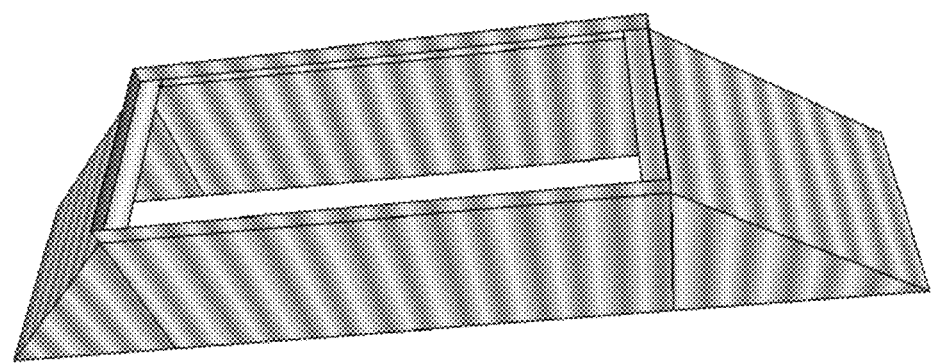
Figure 39:
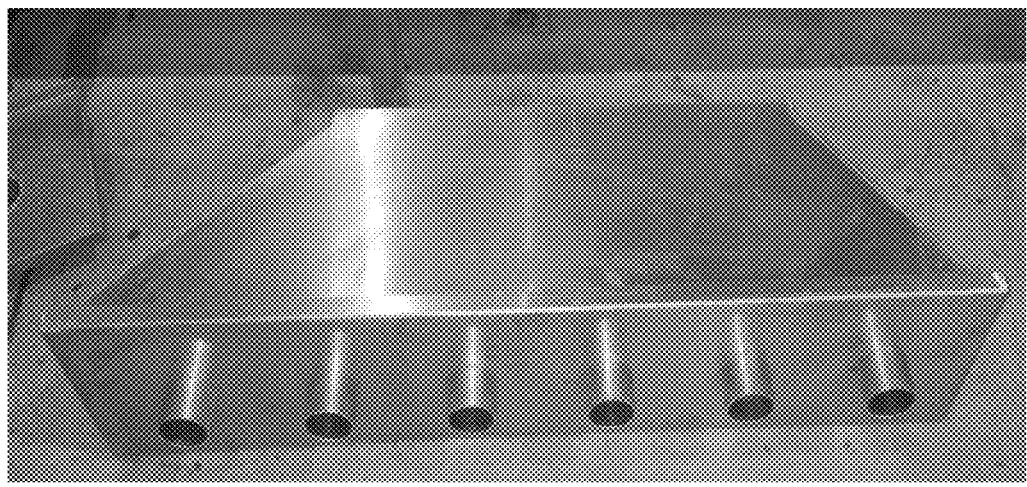
FIG. 39 shows an embodiment of a plenum with removable lid.
Figure 40:
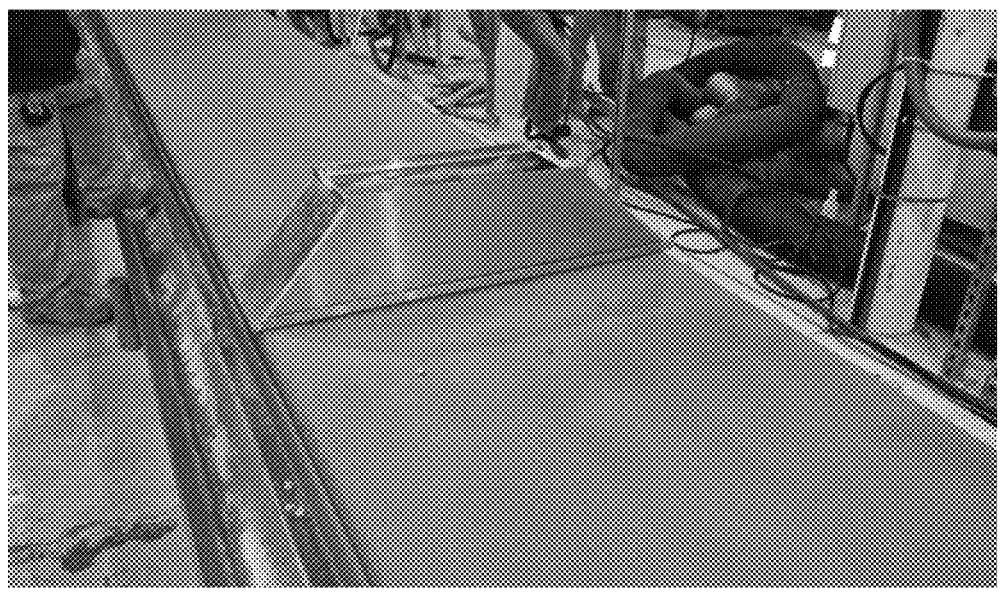
FIG. 40 shows an embodiment of a plenum with removable lid installed on hollow core slab.

FIG. 38 and FIG. 39 show the plenum consisting of a base plate with a removal lid that can act as a plenum for gas injection or gas removal. FIG. 40 shows the plenum shown in FIG. 38 and FIG. 39 installed on a hollow core slab.

In some embodiments, plenums in the secondary gas circulation loop are formed by using the base plate shown in FIG. 38. In some embodiments, the plenum is formed by leaving the holes behind in the precast object part that connects the surface of the precast object to the void inside precast object. In the hollow core slab, the void in the hollow core slab is the channel. One skilled in the art may use other tools to create the opening on the surface of the precast object to gain access to the void inside the precast part. In some embodiments, the removable lid is not used and the base plate is left on the top of the hollow core slab after creating the holes to connect the channels with the surface of the hollow core slab.

In some embodiments, no fan or heater is placed on the top of the base plate or holes created using the base plate. The opening created is used as is as a plenum in the secondary gas circulation loop.

The tubes protruding from the plenum, as shown in FIG. 34, FIG. 38 and FIG. 39, are used as gas injection and removal ducts. The tubes can have many configurations depending on the geometry best suited for a given system. The tubes may be angled, may have a hole on the center of the tube, or may have multiple holes. The tubes may be separated in halves, one half to perform the injection and the other half to perform suction, as shown in FIG. 34.

The plenums may include multiple sensors depending on what measurements are required. Parameters that are usually monitored when curing a hollow core slab made up of carbonatable calcium silicate cement are pressure, carbon dioxide concentration, temperature, and relative humidity.

The enhanced plenums contain internal heaters and or fans, the heaters are used to decrease the temperature gradient through the length of the slab, as shown in FIG. 34. Fans are used to drive flow within the cores of the hollow core slab and circulate flow on the envelope within the seal, as shown in FIG. 35.

In some embodiments, the process to cure precast objects—including hollow core slabs—includes a heating unit in at least some of the plenums used. In some embodiments, the heating unit is an electrical heating element over which the cold gas extracted at the third condition is passed to increase the temperature.

In some embodiments, the process to cure precast objects—including hollow core slabs—include a fan in at least some of the plenums used to redistribute the gas within the envelope through formation of secondary gas circulation loop. In some embodiments, the fan is a tangential, centrifugal, axial, cross flow or a reversible fan. In some embodiments, the fans used are variable speed. In some other embodiments, the fans are constant speed. Combinations of different types of fans within in the same system are envisaged within the scope of this disclosure.

Figure 41:
FIG. 41 shows an embodiment of a plenum with removable lid enhanced—heating element.
Figure 42:
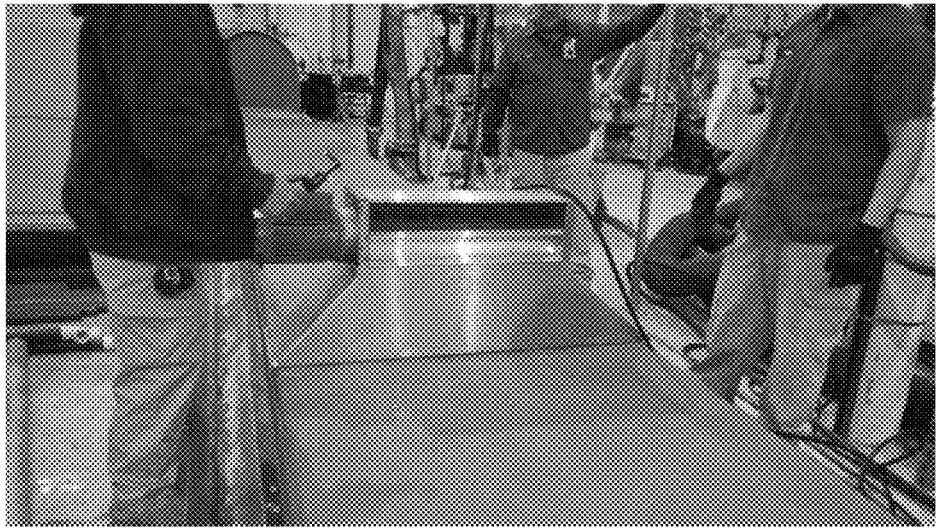
FIG. 42 shows an embodiment of a plenum with removable lid enhanced—tangential fan—variable speed.
Figure 42:

FIG. 41 and FIG. 42 show the heating element that is installed within the plenum on the hollow core slab and the reversible fan that can be used for redistributing the gas within the envelope.

In some embodiments, the plenum is supplied with gas from a secondary gas conditioning system through the use of a pipe placed on the side of the casting bed, along the floor of the envelope, or along the wall of the envelope. The pipe carries the conditioned gas from the secondary gas conditioning system and has capped openings at regular intervals. The capped opening closest to the plenum is uncapped and connected to the plenum.

The inlets and outlets connected to the perforated hoses, the modified casting bed, the perforated pipes, the envelope, and to the primary gas conditioning system form the primary gas circulation loop. Additionally, the plenum(s) and the pipes with the capped openings may be combined to create the secondary gas circulation loop. In the secondary gas circulation loop, conditioned gas that is injected at a first condition in the primarily circulation loop is removed after traveling some length in or around the precast object in the envelope at a third gas condition, reconditioned using a secondary conditioning system to a fourth condition. Once the gas has been reconditioned to the fourth condition it is flowed over at least another surface of the precast object. This creates a secondary gas circulation loop. A secondary gas circulation loop or a series of secondary gas circulation loops can be employed to cure hollow core slabs of various sizes and can be configured modularly depending on the specifications of the slab to be produced.

In some embodiments, plenums placed on the top of the hollow core slab are utilized to circulate gas from the external envelope volume to the internal envelope volume, thereby creating a more uniform gas condition within the channels of the hollow core slab. A number of plenums can be utilized within the envelope to facilitate the curing of slabs too long to uniformly cure by a primary circulation gas loop alone.

In some embodiments, a unit for controlling the curing process parameters (e.g., a controller) is provided to centrally control the various operational parameters for the curing apparatus and process, including controlling process step sequences, durations and timing, and for logging data measured during curing operations. In various embodiments, the controller is in communication with at least one of the source of carbon dioxide, the gas flow subsystem, operation of the envelope, the primary gas circulation loop, the primary gas conditioning systems, the secondary gas circulation loop, the secondary gas conditioning systems, including temperature control units and humidity control units. In some embodiments, the controller is in communication with sensors that provide data about the process, such as temperature, humidity, flow rates, gas pressures, gas compositions and the like. The controller is configured, for example, to monitor and control independently and/or centrally one or more of the flow rate and direction of the gaseous carbon dioxide, the temperature of the gas, and the humidity, etc., at various locations in the envelop.

Superior properties and performance characteristics suitable for specific applications may be obtained. In certain embodiments, the composite material is characterized by a compressive strength from about 20 MPa to about 175 MPa (e.g., about 20 MPa to about 150 MPa, about 20 MPa to about 120 MPa, about 20 MPa to about 100 MPa, about 20 MPa to about 80 MPa, about 20 MPa to about 65 MPa, about 30 MPa to about 120 MPa, about 30 MPa to about 100 MPa, about 30 MPa to about 65 MPa, about 60 MPa to about 120 MPa, about 90 MPa to about 130 MPa, about 100 MPa to about 175 MPa, about 120 MPa to about 175 MPa, about 140 MPa to about 175 MPa, about 150 MPa to about 175 MPa).

In certain embodiments, the composite material is characterized by a flexural strength from about 3 MPa to about 30 MPa (e.g., about 3 MPa to about 25 MPa, about 3 MPa to about 20 MPa, about 3 MPa to about 15 MPa, about 3 MPa to about 10 MPa, about 10 MPa to about 30 MPa, about 20 MPa to about 30 MPa, about 5 MPa to about 20 MPa).

In certain embodiments, the composite material is characterized by water absorption of less than about 10%. In some other embodiments, the composite material is characterized by water absorption of less than about 8%. In some other embodiments the composite material is characterized by water absorption of less than about 5%. In some other embodiments the composite material is characterized by water absorption of less than about 4%. In some other embodiments the composite material is characterized by water absorption of less than about 3%. In some other embodiments the composite material is characterized by water absorption of less than about 2%. In some other embodiments the composite material is characterized By water absorption of less than about 1%.

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

This disclosure is not limited to the exact contents included herein. Combinations and/or modifications apparent to one of ordinary skill in the art are envisaged within the scope of this disclosure. Some non-limiting examples are described below to illustrate certain aspects of the invention.

EXAMPLES

Example 1

This exemplary set-up includes forming holes from the top of the hollow core slab to access the channels of the hollow core slab at three points along the length of a 16-meter long hollow core slab. Specifically, these holes were located at the beginning, the center and at the end of the 16-meter hollow core section. These holes were formed using a plenum base as show in FIG. 41. As shown in FIG. 41, the plenum base was left in the holes at the beginning and end of the 16-meter hollow core slab.

On one end of the hollow core slab, distal to the gas inlet into the gas tight sealed tarp chamber, a heating unit was placed on top of the plenum prior to mounting the fan on top of the plenum. FIG. 41 also shows the placement of the heating unit on the plenum base. The heating unit was provided to compensate for the heat losses that occur during the gas transport across the length of the hollow core slab. On the other end of the hollow core slab, proximal to the gas inlet, the plenum was placed on the plenum base without the heating unit and the fan was mounted on top of the plenum. The assembly of the plenum with the fan mounted on top is shown in FIG. 42.

The fan on the plenum with the heating unit inside it was oriented to suck gas out of the hollow core. In contrast, the fan was oriented to blow the gas into the hollow core for the second fan and plenum assembly which did not have the heating unit included inside it. Additionally, when the envelope was set up using the sealing tarp, it was ensured that the gas inlet and outlet from the primary gas conditioning system was located at the end where the plenum assembly without the heating unit inside was situated.

Figure 45:
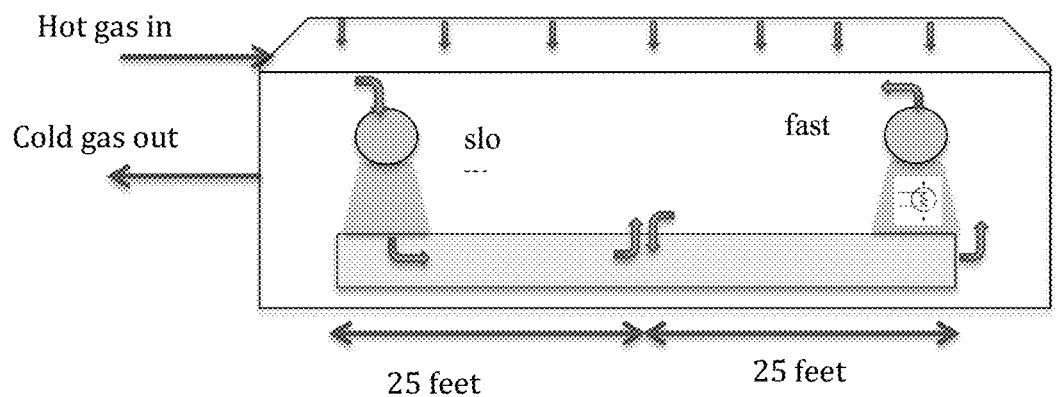
FIG. 45 is a schematic showing hollow core bed with two plenum assemblies inside an envelope formed using a sealing tarp.

The exemplary final set up is schematically shown in FIG. 45.

Figure 46:
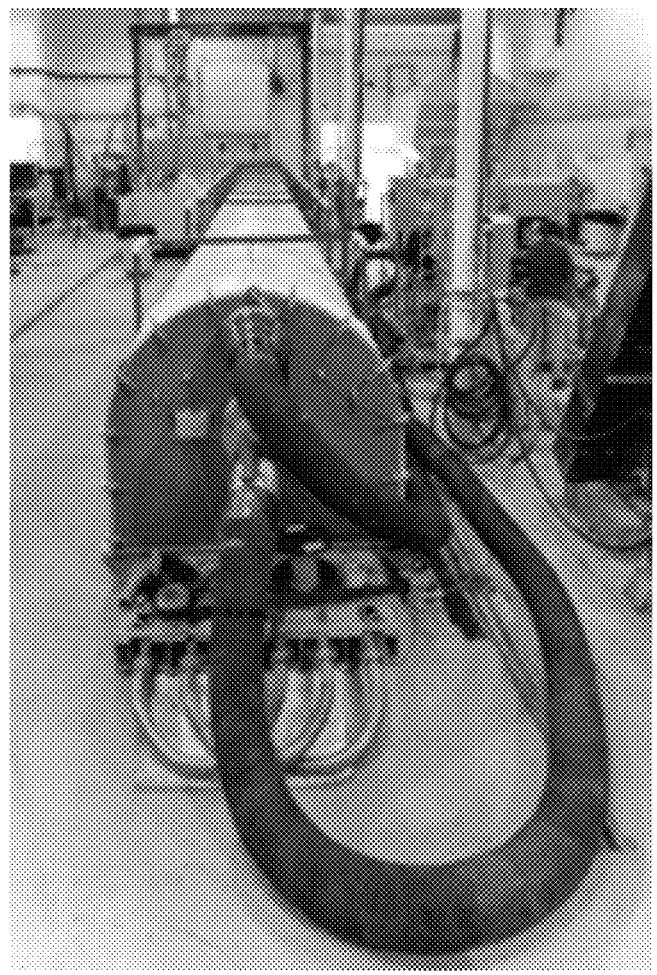
FIG. 46 shows an embodiment of tarp as plenum connected to gas conditioning system.

FIG. 46 shows the actual assembly of an envelope formed used sealed tarp housing a hollow core inside it and connected to the gas conditioning system. The hose on the top in FIG. 45 acts as the gas inlet transporting gas into the gas tight sealed tarp chamber from the gas conditioning system, while the hose on the bottom of FIG. 45 acts as the gas outlet transporting gas out of the gas tight sealed tarp chamber to the gas conditioning unit.

Using the above described set-up parameters, gas flow, relative humidity, $CO_2$ concentration and temperature along the length were manipulated to match the parameters observed and recorded for 6 meter sections of hollow core that yielded a uniformly cured hollow core slab using basic plenums. The uniform curing of the hollow core slab was established by coring samples at various locations along the length and width of the hollow core and evaluating them for compressive strength. The compressive strength target was about 30 to about 40 MPa.

In attempts to attain the compressive strength target and demonstrate uniform cure, it was identified that the fan on the plenum closer to the end plate having inlet and outlet hoses that transport the conditioned gas from the primary gas conditioning system needs to operate at a speed slower than the fan at the other end of the hollow core slab. The slower fan was set to run at 15 Hz whereas the faster fan was set to operate at 25 Hz. This set-up ultimately resulted in a uniformly cured 16-meter section of hollow core slab. In this instance too, consistent with the earlier runs of a 6 meter section of hollow core, temperature increase of the casting bed was seen to improve the uniformity of the drying profile over the length of the product, in turn improving the $CO_2$-curing profile.

A seminal advantage of this system is the ability to expand the capabilities of the system to facilitate the cure of longer hollow core slabs by repeating the set-up back-to-back, thereby elongating the length of the hollow core slab that is possible to be cured using this methodology. Care needs to be taken to scale-up the $CO_2$ gas conditioning system simultaneously to support the scaled-up process while implementing this expansion.

Figure 47:
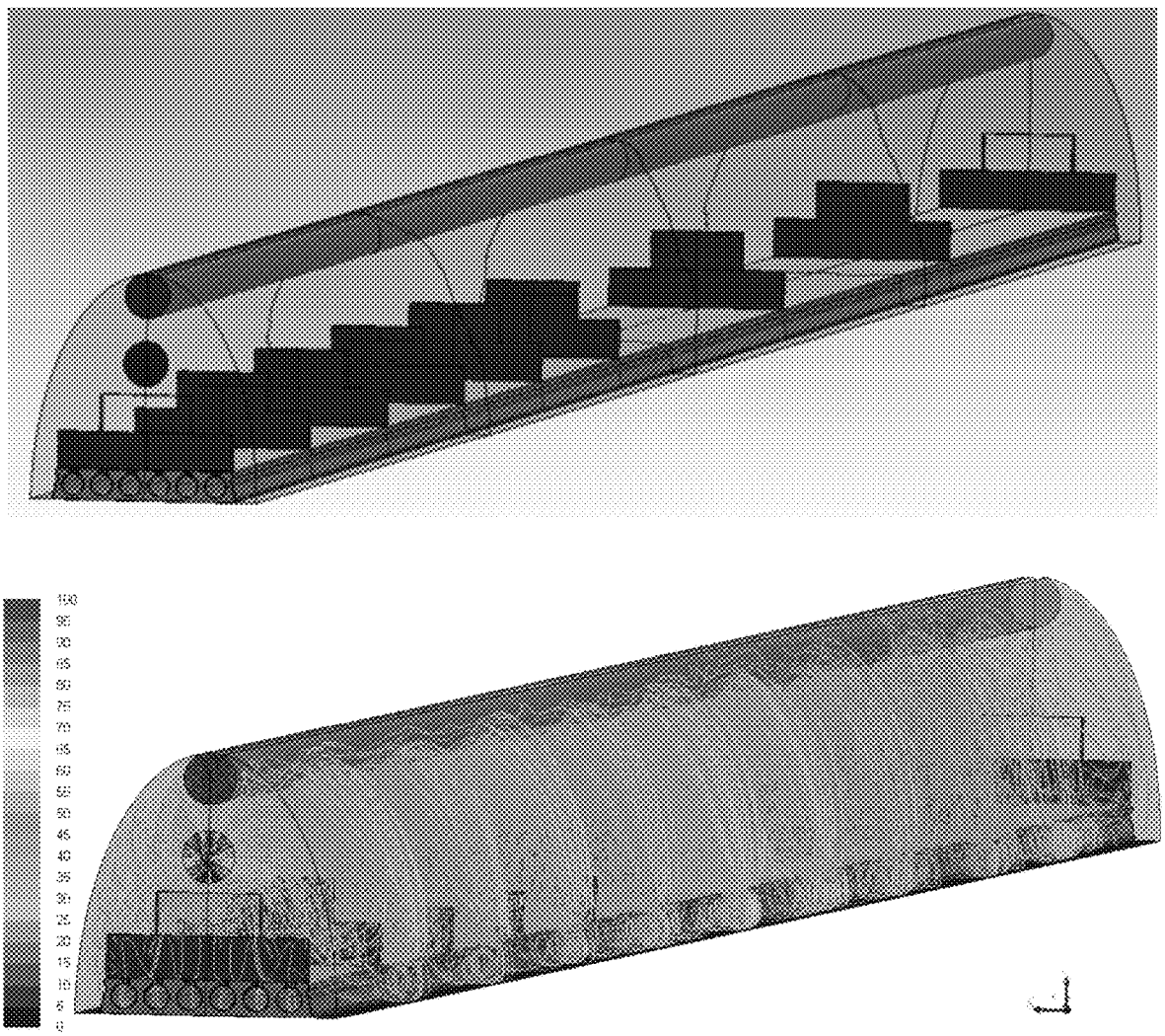
FIG. 47 shows an embodiment of computational fluid dynamics (CFD) model results.

The computational fluid dynamics (CFD) simulations were compared with in house experiments for the developed process. The CFD model predicted a flow pattern of a specific plenum design, after the plenum was fabricated and connected to the $CO_2$-curing system; the blower capacity was adjusted to maintain a consistent gas velocity. The resulting product verified the CFD predictions as shown in FIG. 47.

Example 2

In another exemplary set-up, only one plenum was used in the center of the 16-meter long hollow core section. No heater was used in the plenum. The fan in the plenum was configured to blow up out of the core of the hollow core slab. Only holes were punched through the top of the hollow core slab to access the cores inside. The fan was placed on the plenum base to form a plenum assembly described in FIG. 41 without the heating unit installed on top of the plenum base. This set-up did not result in a fully cured sample, emphasizing the need for maintaining a control of the gas condition within a range throughout the length of the envelope and for ensuring that at no point the conditions fall below the critical points.

Figure 48:
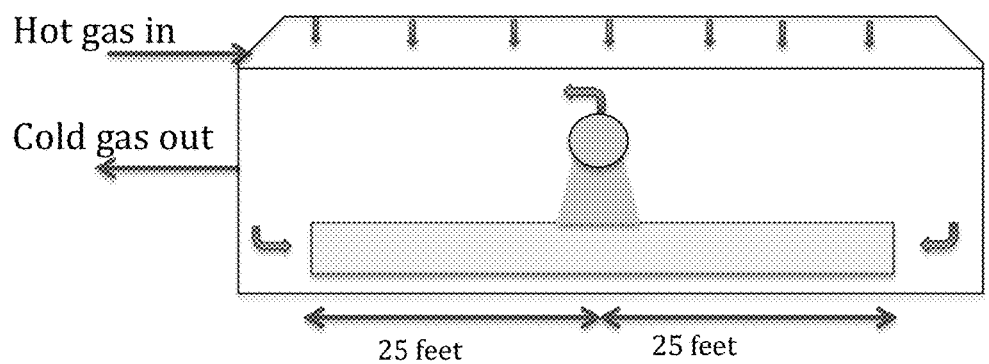
FIG. 48 is a schematic of the set-up with only one fan.

FIG. 48 shows the set-up used in Example 2.

Example 3

As another control, a trial was conducted where the set-up was similar to the one shown in FIG. 45; however, the speeds of the fan on the plenum assemblies were held at the same speed. This trial resulted in a non-uniformly cured hollow core slab. This, in conjunction with Example 2, clearly illustrates the need for regulating the gas flow inside the tarp chamber to get a uniformly cured hollow core slab.

Figure 49:
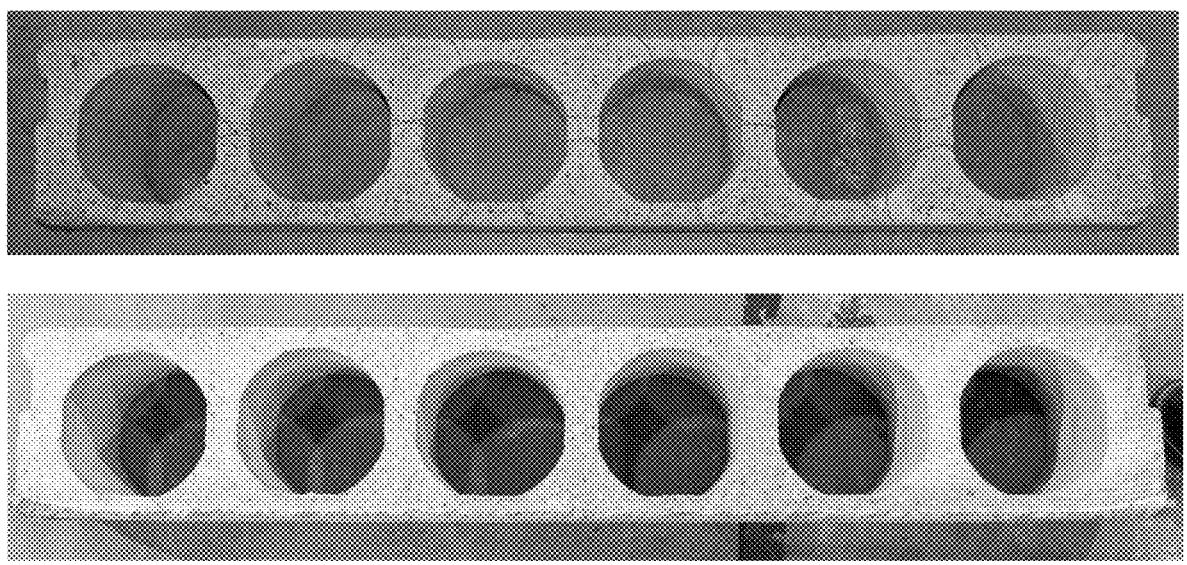
FIG. 49 shows an embodiment of a cross-section of the hollow core slab prepared with the set-up in accordance with Example 2 (top) along with a cross-section from the run that was uniformly cured (bottom) using the set-up described in Example 1.

FIG. 49 shows a cross-section of the hollow core slab prepared with the set-up in accordance with Example 2 (top) along with a cross-section from the run that was uniformly cured (bottom) using the set-up described in Example 1.

The governing consideration is the uniformity of gas condition over and in the hollow core slab during the curing process. As the gas flows through the cores, it extracts moisture from the precast object during the curing cycle. The latent heat of evaporation of water causes a heat loss. Heat is also lost as the mass of the precast object acts as a heat sink. These two factors cause a non-uniform gradient in temperature along the length of the hollow core slab during the curing process. The fans in the plenum and the heater inside the plenum, as used in Example 1, act as a source of heat within the envelope formed using the sealed tarp and help mitigate the formation of non-uniform gradients inside the gas sealed tarp chambers.

Example 4

Figure 50:
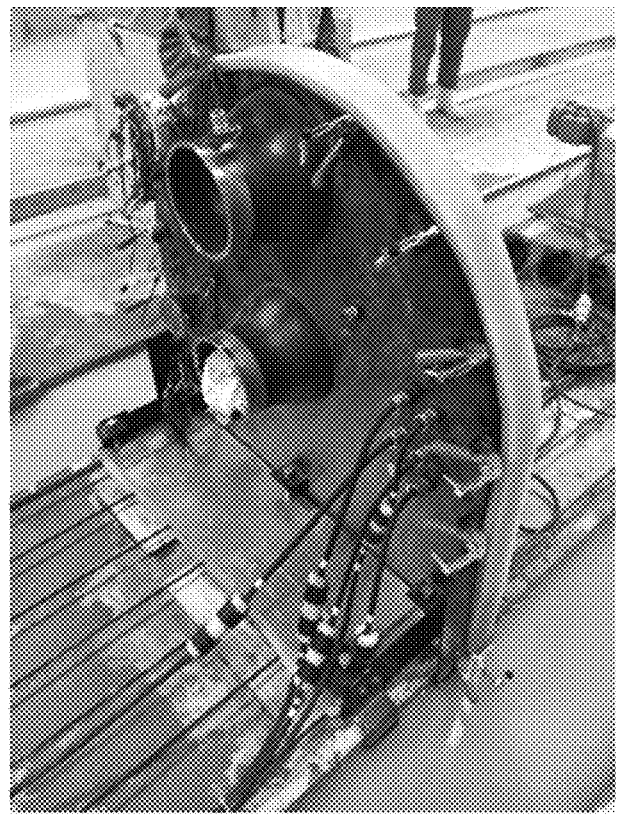

FIG. 50 shows the end plates designed for supporting the gas tight sealed tarp chamber while providing a sealable slot in the bottom section to allow for the reinforcement strands to pass through. These strands, located at the bottom of the hollow core slab, are pre-tensioned prior to the extrusion of the concrete and remain in tension until the precast object has cured. The tension on the strands is released prior to cutting the hollow core slab. The slippage on the strand after the release of tension is measured to access the degree of cure. For the degree of cure to be acceptable a slippage of no more than about 5-6 mm is desired. FIG. 50 also shows the openings for gas inlet (top) and outlet (bottom) on the end plate.

Figure 51:
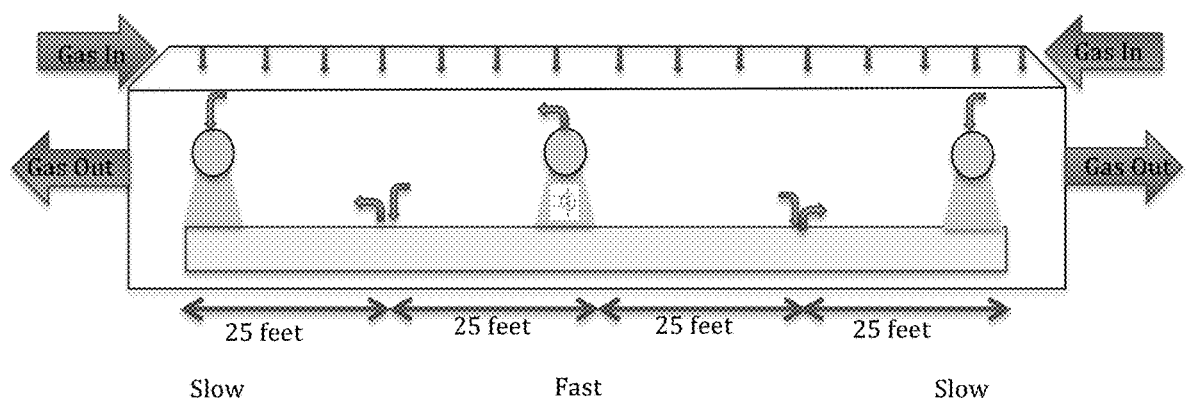
FIG. 51 is a schematic showing hollow core bed with three plenum assemblies inside a gas tight tarp sealed chamber.

A schematic for the set-up configuration is shown in FIG. 51. In this configuration, three plenums with fans mounted on top were placed on top of the hollow core slab. Two of these assemblies were placed at ends of the slab and one in the center. The fans at the ends were configured to blow gas into the hollow core slab whereas the fan in the center was configured to suck gas out of the hollow core.

Figure 52:
FIG. 52 shows an embodiment of the gas tight sealed tarp chamber set-up for curing a 32-meter long hollow core slab at the Hollow Core Slab Customer plant.

FIG. 52 shows the gas-tight, sealed tarp chamber set-up to cure a 32-meter extruded section of hollow core. In this instance, a 20-cm thick hollow core slab is inside the envelope formed using a gas tight sealed tarp.

Also seen in FIG. 52 are the inlet hose (yellow) and outlet hose (black) that transport the $CO_2$ gas back and forth to the enveloped formed using the sealed tarp from the primary gas conditioning system.

Figure 53:
FIG. 53 shows an embodiment of three sections of hollow core slabs: bottom two 9-meter long and top one 6-meter long, which resulted from the 32-meter long cured hollow core slab.

Using the above set-up a 32-meter long, 20-cm thick, hollow core slab was successfully cured. FIG. 53 shows the three sections of hollow core slabs—bottom two 9-meter long and top one 6-meter long—that resulted from the 32-meter long cured hollow core slab.

A successful cure was achieved and was characterized by all the seven strands, located at the bottom of the hollow core slab, passing the strand slippage criteria upon release of the tension after the curing was stopped. No slippage of the strand in the cured concrete was observed.

Example 5

Figure 54:
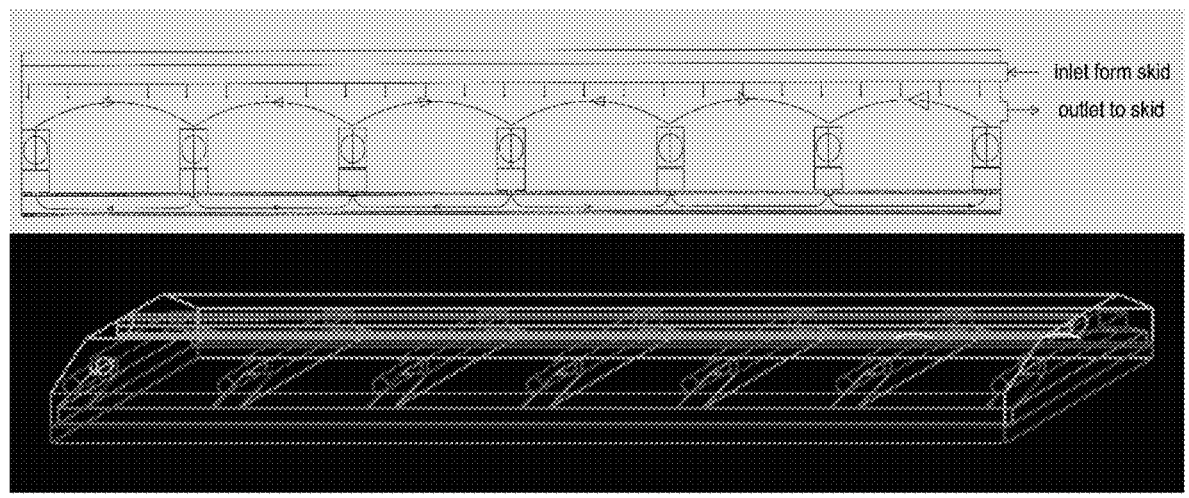
FIG. 54 shows schematics for 300-foot/100-meter long hollow core slab with reversible fans.

FIG. 54 shows a schematic of an exemplary set-up for curing a 100-meter long hollow core slab. In this set-up, plenums having reversible fans are used in the secondary gas circulation loop to facilitate the curing of a hollow core slab of 100 meters in length. Using this set-up, hollow core slab longer than 100 meters can be successfully cured.

The primary gas circulation loop includes an inlet into an envelope formed using a sealing tarp. The inlet feeds the gas at a first condition into the tube that runs along the length of the envelope on the top the chamber and is attached to the envelope. The tube has holes for delivering the gas into the envelope along the length of the envelope.

As described herein, however, the temperature and/or gas composition changes as the gas traverses the length of the envelope. To successfully cure the entire length of a 100-meter hollow core slab, a secondary gas circulation loop is required.

The plenums with reversible fans and heating elements, take the gas in the envelope above and in the channels of the hollow core slab at a third condition and pass it over a secondary gas conditioning system to bring it to a fourth condition. This reconditioned gas at the fourth condition is passed over at least another surface of the hollow core slab. This forms the secondary gas circulation loop.

Figure 55:
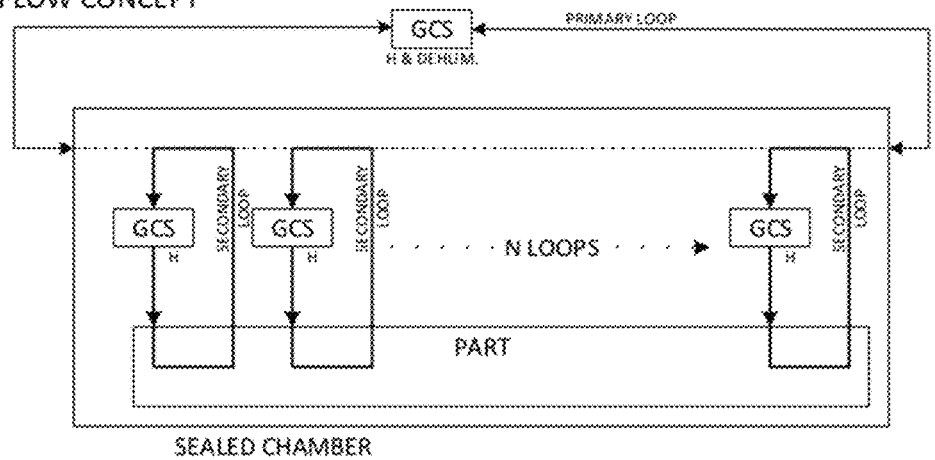
FIG. 55 is a schematic of primary gas circulation loop and secondary gas circulation loops for hollow core slabs.

FIG. 55 shows a schematic of primary gas circulation loop and secondary gas circulation loops for hollow core slabs used for curing a long hollow core slab (e.g., 100-meter long section).

Figure 56:
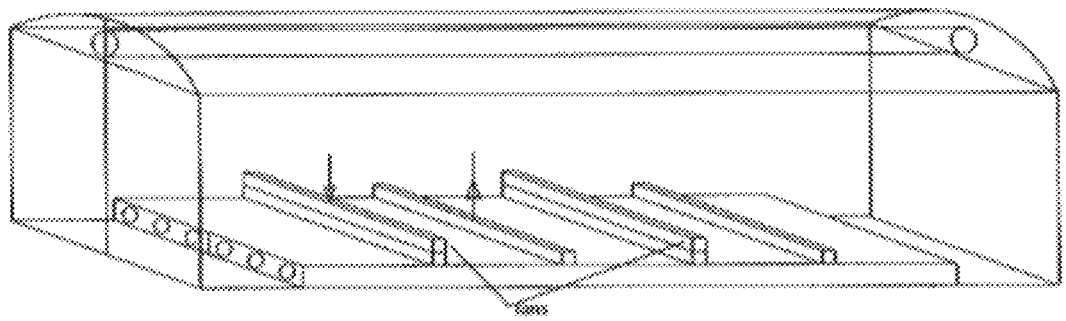
FIG. 56 shows schematics for a 300-foot/90-meter long hollow core slab with fans, every other plenum has a fan to drive flow through the slab. The tarp has only one main supply to introduce gas.

FIG. 56 shows a schematic of the system where every other plenum has a fan instead of having all the plenums with a fan to drive the flow.

Example 6

Figure 57:
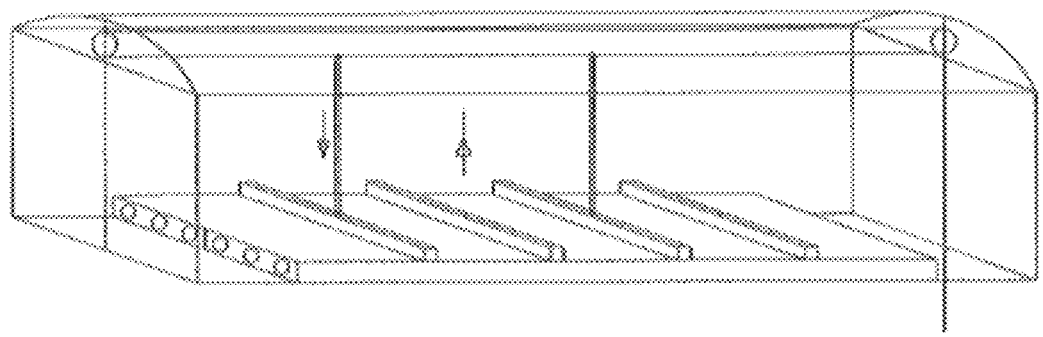
FIG. 57 shows schematics for a 300-foot/100-meter long hollow core slab without fans, plenums are connected directly to the tarp. The tarp has only one main supply to introduce gas.

FIG. 57 shows a schematic for curing a hollow core slab of a length greater than or equal to about 100 meter. In this set-up, plenums without fans are used in the secondary gas circulation loop to facilitate the curing of a hollow core slab.

The primary gas circulation loop is identical to the set-up described in Example 5. In addition to the holes in the tube that runs along the length of the envelope, the tube also has extensions to connect directly into the plenums placed on top of the hollow core slab.

In some embodiments, the primary gas conditioning system also may serve as the secondary gas conditioning system. In a modification of this embodiment, the plenums may have a heater and/or dehumidification units separately attached to form a discrete secondary gas conditioning system catering to the secondary gas conditioning system.

Example 7

Figure 58:
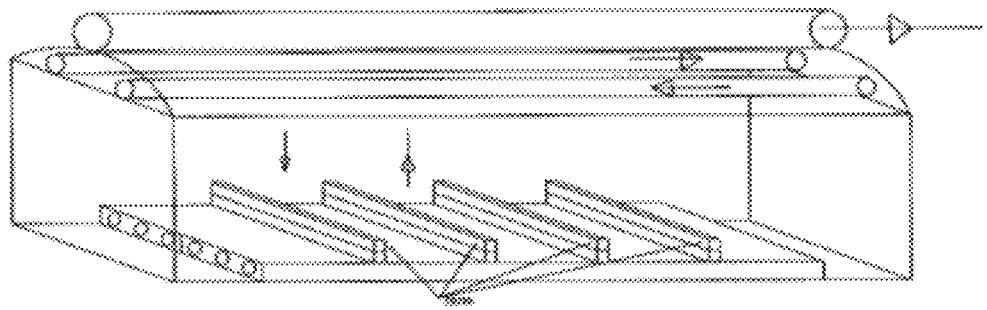
FIG. 58 shows schematics for a 300-foot/90-meter long hollow core slab with fans, the tarp has a gas source and two gas removal artifacts. The plenums have fans in them for the circulation loop.

FIG. 58 shows a schematic for curing a 100-meter long hollow core slab. In this set-up, plenums with reversible fans are used in the secondary gas circulation loop to facilitate the curing of a hollow core slab of a length greater than or equal to 100 meters.

Here, the primary gas circulation loop includes an inlet into an envelope formed using a sealing tarp. The inlet feeds the gas at a first condition into the tube that runs along the length of the envelope on the top of the envelope. In some embodiments, the tube is attached to the envelope. The tube has holes for delivering the gas into the envelope. The outlet, through which the gas at the second condition is removed, includes two tubes that run along the length of the envelope (on top of and attached to the envelope). The tubes used to remove gas from the chamber also have holes along the length of the envelope.

The direction of flow in the two tubes used for outlet has been shown to be opposite in FIG. 58, in some embodiments this flow may be in the same direction. The direction of flow in the two tubes serving as the outlet and a tube serving for the inlet may be in the same direction or opposite directions.

The secondary gas circulation loop is the same as Example 5.

Example 8

Figure 59:
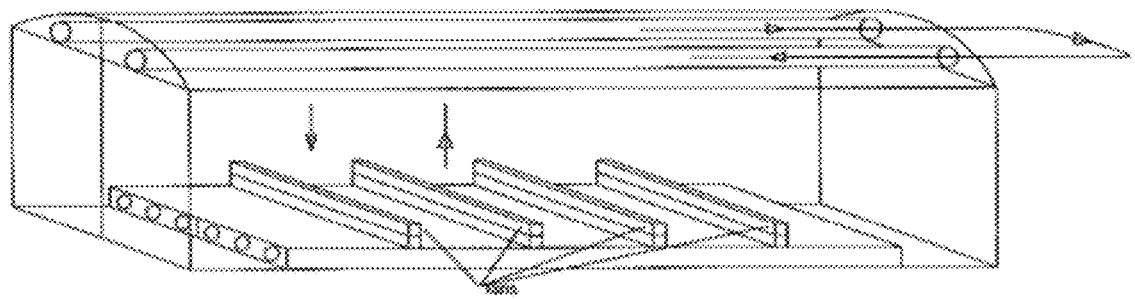
FIG. 59 shows schematics for a 300-foot/100 meter long hollow core slab with fans, the tarp has two inlets to supply gas into the envelope. The plenums have fans in them for the circulation loop.

FIG. 59 shows an schematic for curing a 100-meter long hollow core slab where in the primary circulation loop includes a tube that runs the length of the chamber and then loops back traversing at least a significant length of the envelope to come to the outlet and return back to the primary gas conditioning system. The tubes have holes for delivering the gas into the envelope. Using two tubes to insert gas instead of one is useful in controlling temperature gradients along the length of the slab In this set-up, plenums with reversible fans are used in the secondary gas circulation loop to facilitate the curing of a hollow core slab of 100 meters in length.

The secondary cortication loop is the same as Example 5.

Example 9

Figure 60:
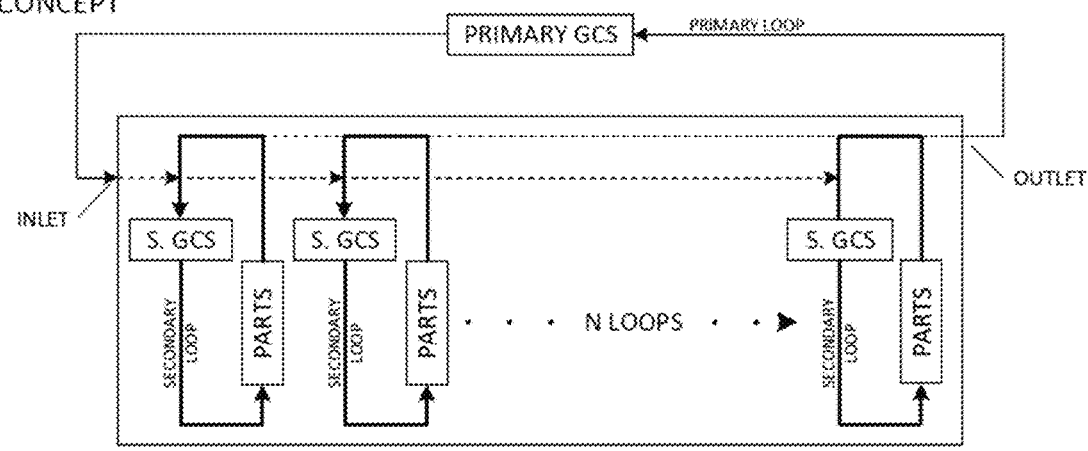
FIG. 60 is a schematic for a sealed chamber showing primary and secondary circulation loops to cure precast articles.

FIG. 60 shows a schematic for an envelope using primary and secondary circulation loops to cure precast objects (e.g., pavers, blocks, roof tiles, railroad ties). In this set-up, the primary conditioning system includes of a dehumidiation unit and a fan external to the envelope. The primary conditioning system may optionally also include a heating unit. The primary loop introduces gas at the first condition to the envelope through the inlet and extracts the gas at the second condition from the envelope through the outlet.

Within the envelope, there is a secondary conditioning loop that includes at least a heater and at least a circulation fan. Typically, many such secondary conditioning loops can be included within an envelope to facilitate uniform gas conditions within the length and breadth of the envelope. The secondary gas circulation loop increases the temperature of the gas and recirculates it through the envelope to pass over another surface of the concrete part at another part of the envelope.

Example 10

Figure 61:
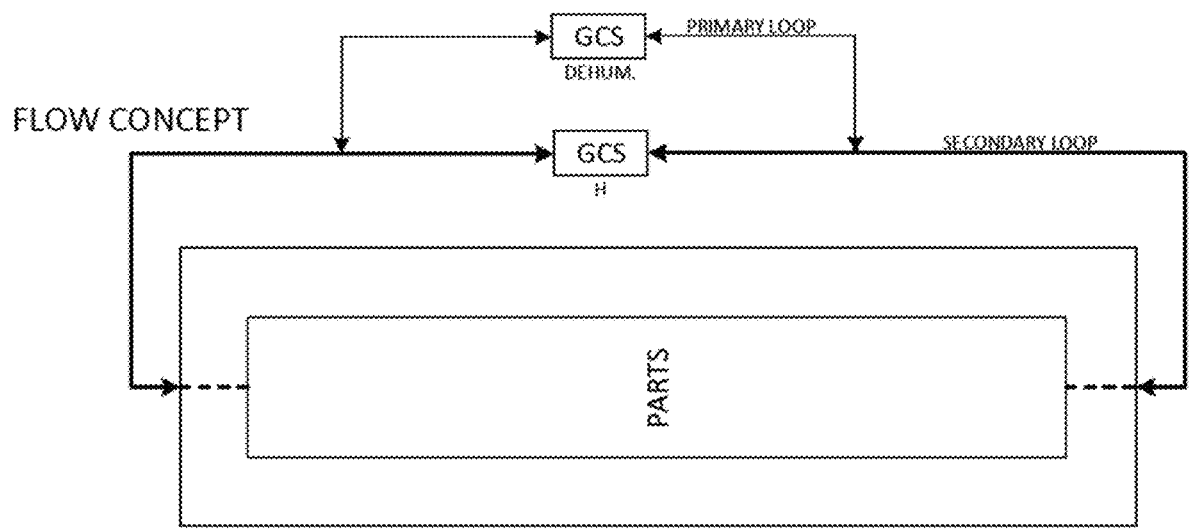
FIG. 61 is a schematic for an envelope, showing primary and secondary circulation loops.

FIG. 61 shows a schematic for an envelope using primary and secondary circulation loops to cure precast objects (e.g., pavers, blocks, roof tiles, railroad ties).

In this set-up, the primary conditioning loop includes a chiller and a fan external to multiple envelopes, i.e., one primary conditioning loop caters to more than one envelope. The primary loop introduces conditioned gas at the first condition to the inlet and extracts gas at the second condition from the outlet. This is attained through the use of a primary gas conditioning system included in the primary gas circulation loop. The primary gas conditioning system includes flowing the gas at a first flow rate over a heating unit to increase the temperature of the gas and flowing the gas through a dehumidification unit, at a second flow rate to reduce the relative humidity.

This difference in the flow rate is advantageous due to the low heat capacity of these low-density gases, such as the carbon dioxide gas used during curing. The rate at which the gas can be heated by passing over the heating unit is slower than the rate at which moisture can be taken out from it in a dehumidification system. Additionally, removal of water further tends to lower the temperature of the gas due to the latent heat of vaporization of water. This adds an additional demand on the heating unit.

Due to these discrepancies in the dehumidification and heating requirements in the primary gas conditioning system, creating a system wherein the dehumidification happens in parallel to the heating offers a significant advantage with regards to the design of the system. The equipment size for each of the components of the primary gas condition can be specified accurately driving the overall cost of the equipment down while maximizing the speed and efficiency of the curing cycle.

The primary conditioning loop connects to the envelope at the two opposite ends of each incorporated multiple envelopes. In some embodiments, the primary conditioning loop can alternate the direction of the gas flow by switching the inlet and outlet with each other. In some embodiments, also present is a secondary gas circulation loop. The secondary conditioning loop includes a secondary gas conditioning system. The secondary gas conditioning system includes internal heater, fan, dehumidification unit or a combination of the above. The secondary gas conditioning system takes the gas at a third condition within the chamber and by changing the temperature of the gas and/or gas composition brings it to a fourth condition. This gas that has been brought to a fourth condition is recirculated through the envelope to pas over another surface of the precast concrete within the chamber. The fan used in the secondary gas circulation loop may be reversible allowing the direction of the flow in the secondary gas circulation loop to be reversed during curing to improve the uniformity of conditions throughout the length and breadth of the envelope.

Additional background discussions and examples of curing systems and related topics may be found in U.S. Pat. No.

9,221,027, U.S. Pub. No. 2015/0225295 (application Ser. No. 14/602,313), U.S. Pub. No. 2015/0336852 (application Ser. No. 14/818,629), U.S. Pub. No. 2017/0102373 (application Ser. No. 15/290,328), each of which is expressly incorporated herein by reference in its entirety for all purposes.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Incorporation by Reference

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A process for curing a precast object, comprising:
introducing the precast object into an envelope that is capable of containing a gas, the envelope having a first end and a second end, wherein the envelope is sealed or vented;
providing a primary gas circulation loop, comprising:
introducing a gas at a first condition into the envelope,
flowing the gas over a surface of the precast object inside the envelope to bring the gas to a second condition,
passing the gas at the second condition through a primary gas conditioning system to restore the gas to its first condition, wherein the primary gas conditioning system includes flowing the gas at a first flow rate over a heating unit to increase the temperature of the gas and flowing the gas through a dehumidification unit at a second flow rate to reduce the relative humidity, wherein the first flow rate is slower than the second flow rate, and
recirculating the gas into the primary gas circulation loop;
providing one or more secondary gas circulation loop, wherein the secondary gas circulation loop comprises:
taking the gas in the envelope from a location spaced from the first end and the second end of the envelope at a third condition, wherein gas in the third condition has a lower temperature, higher relative humidity and/or reduced flow rate, relative to the first condition,
passing it through a secondary gas conditioning system to condition it to a fourth condition, wherein gas in the fourth condition has a higher temperature, lower relative humidity and/or a different flow rate, relative to the third condition, and
flowing the gas after conditioning to the fourth condition over at least another surface of the precast object; and
curing the precast object for a time sufficient to produce a cured precast object.

2. The process of claim 1, wherein the precast object is made of a carbonatable calcium silicate-based cement and the gas is carbon dioxide.

3. The process of claim 1, wherein at least one of the secondary gas conditioning system of the secondary gas circulation loop is located within the envelope.

4. The process of claim 2, comprising providing a plurality of secondary gas circulation loops.

5. The process of claim 1, wherein the secondary gas conditioning system comprises at least a heating unit to raise the temperature of the gas.

6. The process of claim 5, wherein the secondary gas circulation loop comprises at least a fan to increase the flow of the gas.

7. The process of claim 6, wherein the secondary gas circulation loop comprises a plurality of fans to increase the flow of the gas.

8. The process of claim 7, wherein the secondary gas circulation loop has at least some of the fans configured to flow the gas in an opposite direction as compared with the other fans.

9. The process of claim 8, wherein the secondary gas circulation loop has at least some of the fans configured to flow the gas at a first speed while the other fans as configured to flow gas at a speed different from the first speed.

10. The process of claim 6, wherein the secondary gas conditioning system comprises a dehumidification unit to remove moisture from the gas and to reduce the relative humidity.

11. The process of claim 10, wherein the dehumidification unit comprises a chiller, a desiccant, a membrane capable of moisture removal, or a combination of two or more thereof.

12. The process of claim 1, wherein the fourth condition of the gas is substantially the same as the first condition of the gas.

13. The process of claim 1, wherein the fourth condition of the gas is substantially different from the first condition of the gas.

14. The process of claim 1, wherein the gas at the fourth condition after passing through the secondary gas conditioning system is flowed over the another surface of the precast object, wherein the another surface of the precast object is adjacent to the point where it was taken from within the envelope for passing through the secondary gas conditioning system.

15. The process of claim 1, wherein the gas at the fourth condition after passing through the secondary gas conditioning system is flowed over the another surface of the precast object, wherein, the another surface of the precast object is at a point away from the point where it was taken from within the envelope for passing through the secondary gas conditioning system.

16. The process of claim 1, wherein the precast object is a plurality of objects selected from the group consisting of pavers, blocks, roof tiles and railroad ties.

17. The process of claim 1, wherein the precast object is a hollow core slab comprising a plurality of channels running along the length of the hollow core slab.

18. The process of claim 17, wherein the hollow core slab comprises from about 4 to about 10 channels.

19. The process of claim 17, wherein the gas at the first condition is introduced into the envelope through the channels of the hollow core slab.

20. The process of claim 17, wherein the gas at the first condition is introduced into the envelope from the top or sides of the hollow core slab.

21. The process of claim 17, wherein the gas at the first condition is introduced into the envelope from the bottom of the slab through the casting bed.

22. The process of claim 1, wherein the first condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

23. The process of claim 22, wherein the second condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

24. The process of claim 23, wherein the third condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

25. The process of claim 24, wherein the fourth condition is characterized by a temperature of the gas, wherein the temperature of the gas is between about 20° C. to about 99° C.; and/or by the relative humidity of the gas, wherein the relative humidity of the gas is between about 0.1% to about 99%; and/or by the flow rate of the gas, wherein the flow rate facilitates an evaporation rate between about 1 kg/hr/mton to about 100 kg/hr/mton.

26. The process of claim 1, wherein the primary gas conditioning system is configured such that the heating unit and the dehumidifying unit are arranged in parallel.

* * * * *